United States Patent [19]
Ito et al.

[11] Patent Number: 5,396,496
[45] Date of Patent: Mar. 7, 1995

[54] UNUSED TIME SLOT DETECTION AND SELECTION IN A MOBILE RADIO COMMUNICATION SYSTEM

[75] Inventors: Koichi Ito; Yuji Umemoto; Masayuki Tanaka, all of Tokyo, Japan

[73] Assignee: Kabushiki Kaisha Toshiba, Kawasaki, Japan

[21] Appl. No.: 42,521

[22] Filed: Apr. 5, 1993

Related U.S. Application Data

[63] Continuation of Ser. No. 727,583, Jul. 9, 1991, Pat. No. 5,278,835.

[30] Foreign Application Priority Data

Jul. 12, 1990 [JP] Japan ................. 2-184609

[51] Int. Cl.$^6$ .............. H04B 7/212; H04B 7/26; H04J 3/16; H04J 4/00
[52] U.S. Cl. ...................... 370/50; 370/95.1; 370/95.3; 340/825.44; 379/58; 455/54.1; 455/62; 455/343
[58] Field of Search .............. 370/50, 69.1, 70, 76, 370/85.2, 85.3, 95.1, 95.2, 95.3, 100.1, 104.1, 105.1, 105.2, 105.4, 106; 379/57, 58, 59, 60, 61, 62, 63; 340/825.44; 455/33.1, 33.2, 33.3, 33.4, 34.1, 34.2, 54.1, 54.2, 56.1, 62, 63, 343

[56] References Cited

U.S. PATENT DOCUMENTS

| | | | |
|---|---|---|---|
| 4,504,946 | 3/1985 | Raychaudhuri | 370/95.3 |
| 4,802,201 | 1/1989 | Yoshizawa et al. | 379/62 |
| 5,081,704 | 1/1992 | Umeda et al. | 370/95.3 |
| 5,086,452 | 2/1992 | Ito et al. | 379/61 |
| 5,134,615 | 7/1992 | Freeburg et al. | 370/95.3 |
| 5,210,752 | 5/1993 | Ito et al. | 370/95.1 |

*Primary Examiner*—Alpus Hsu
*Attorney, Agent, or Firm*—Banner, Birch, McKie & Beckett

[57] ABSTRACT

A mobile radio communication system includes a plurality of base stations connected to a network through wire lines, and a plurality of mobile stations connected to the base stations through radio channels. The base and mobile stations share a plurality of radio frequencies and transmit at least one transmission signal at one of the shared radio frequencies. The transmission signal is arranged into time frames each having a plurality of time-division multiplexed slots. The base and mobile stations both include a control circuit having means for detecting unused time slots within the transmission signal and means for selecting one of the unused time slots. A radio channel establishing circuit establishes a channel between the mobile radio communication apparatus and the base station in accordance with the selected time slot.

11 Claims, 15 Drawing Sheets

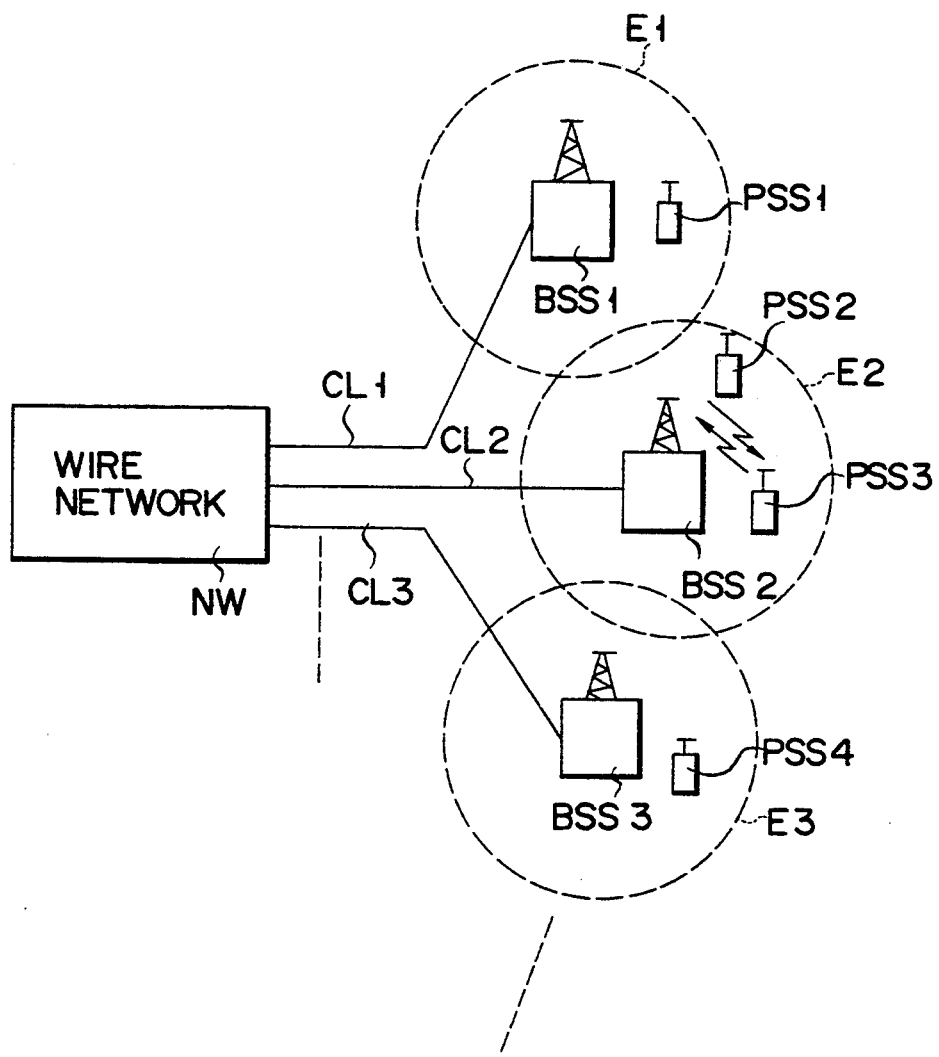
F I G. 1

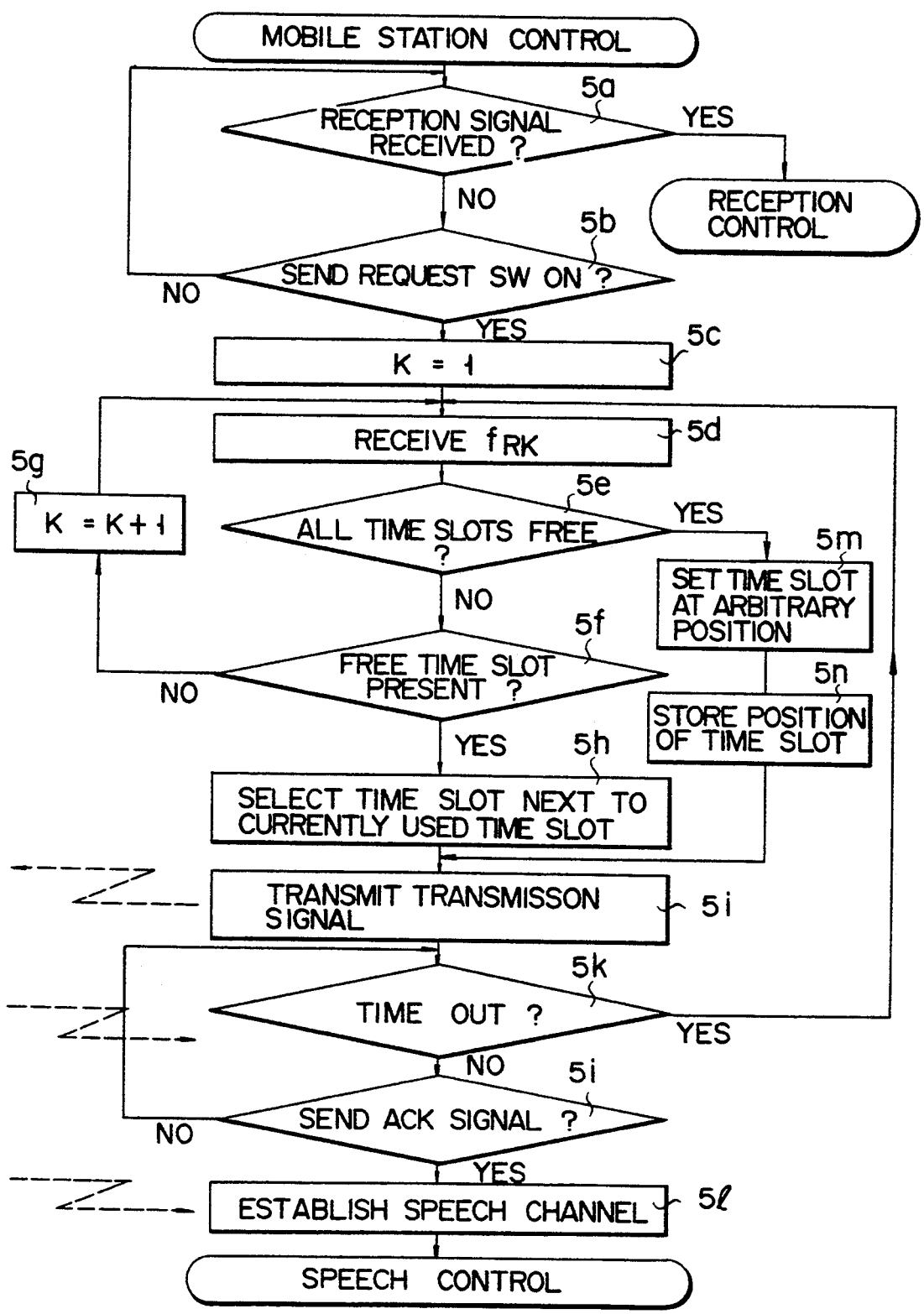
F I G. 5A

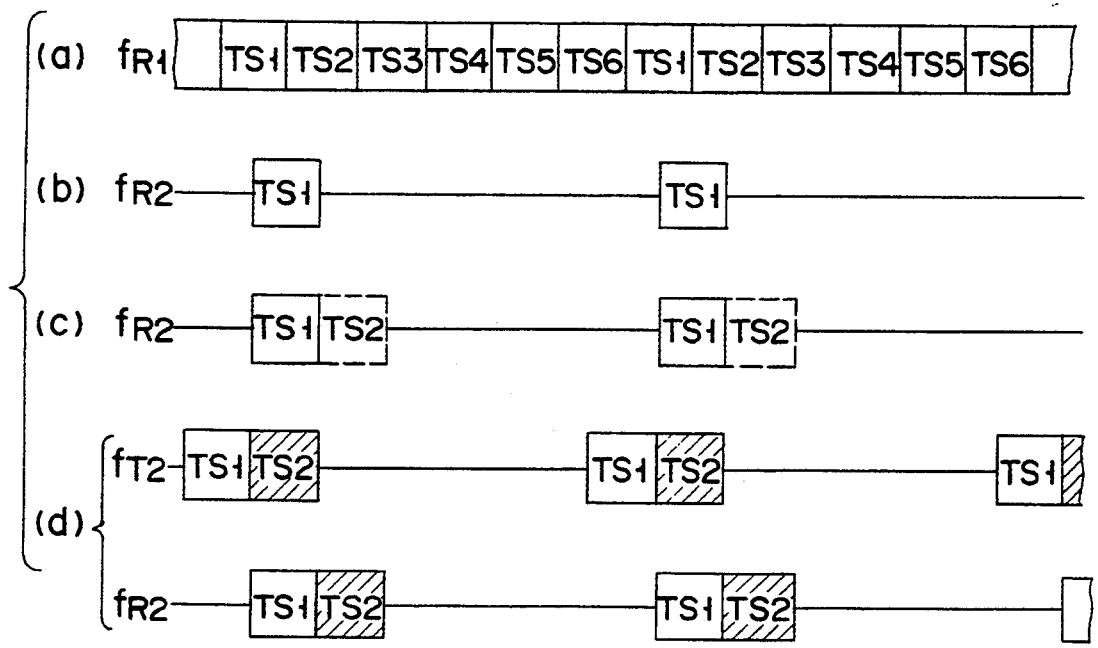
F I G. 6
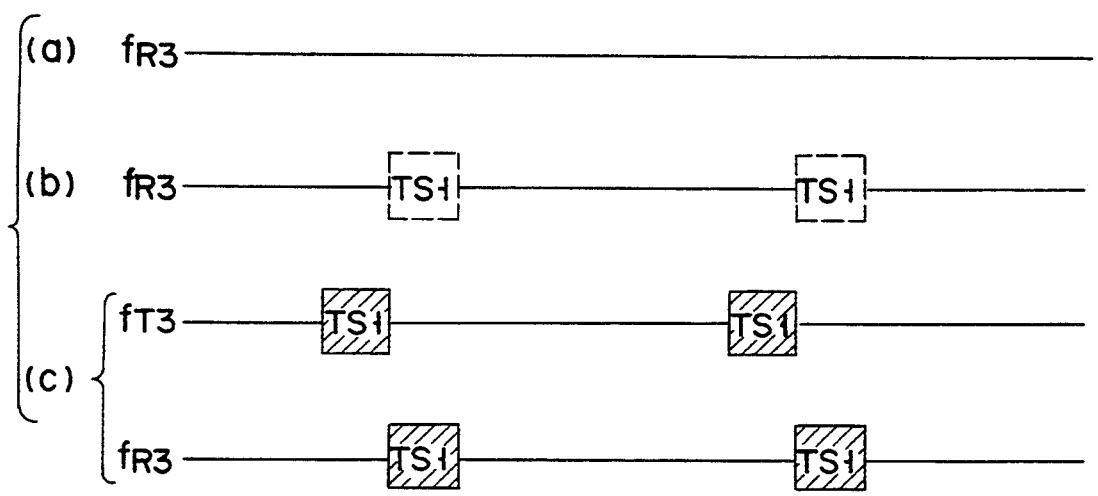
F I G. 7

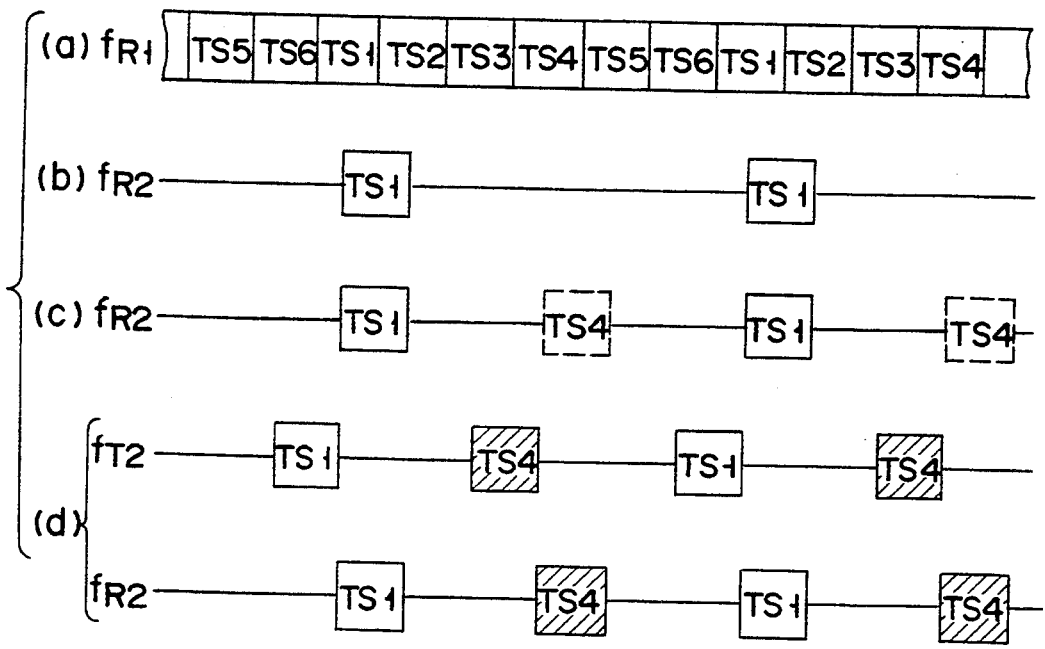
F I G. 9
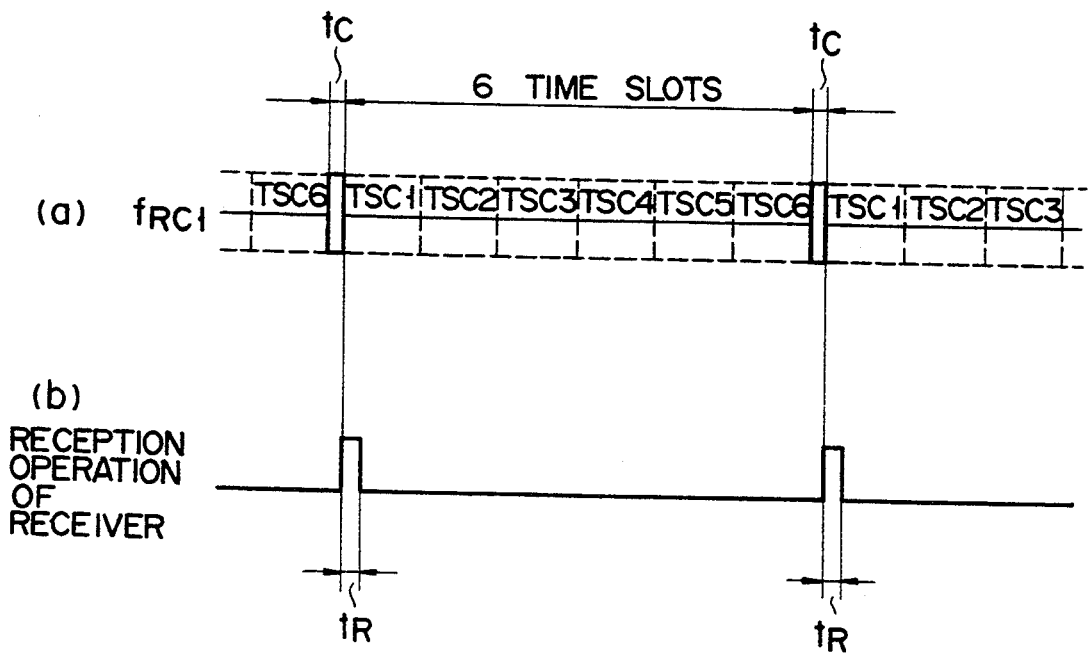
F I G. 10

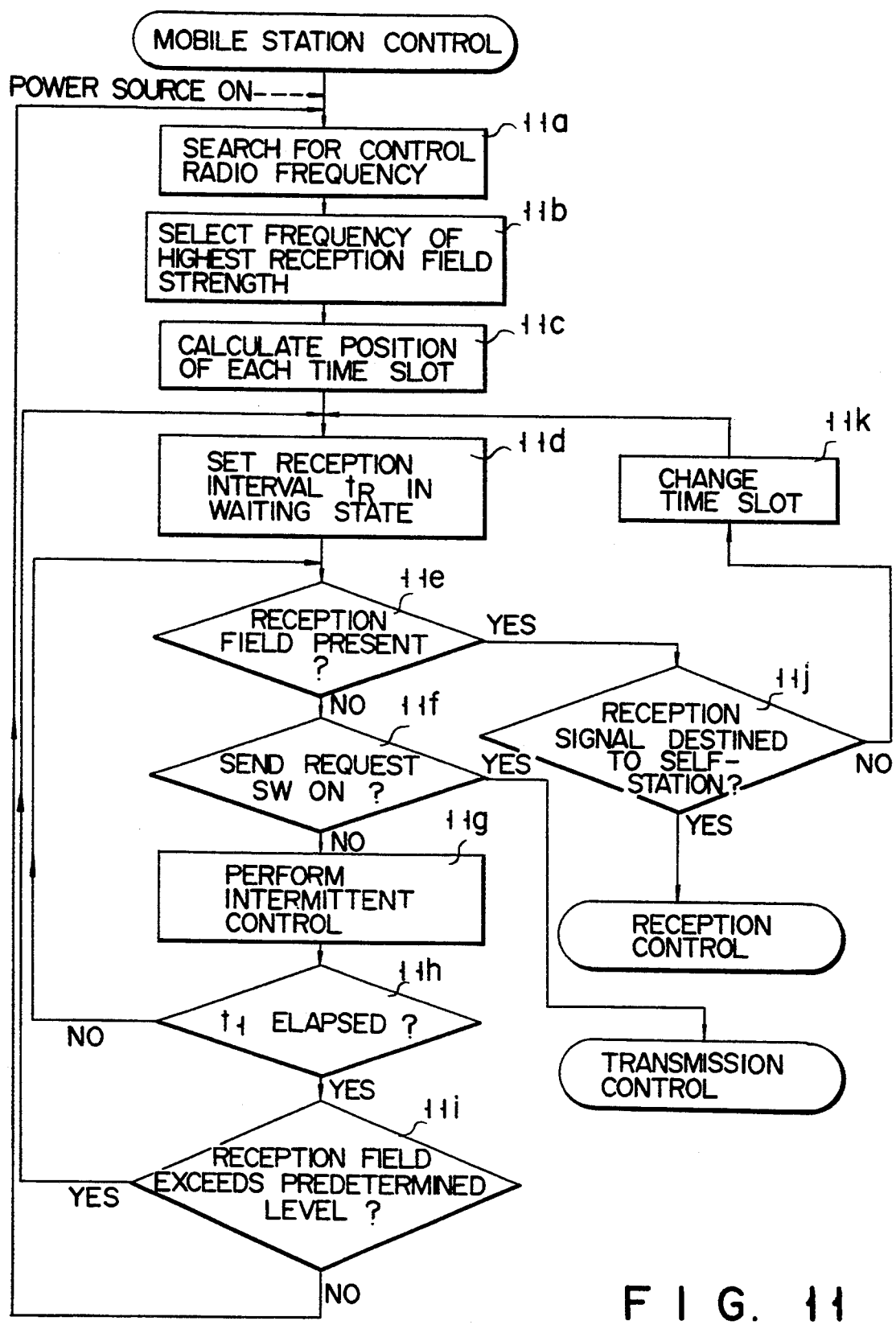
F I G. 11

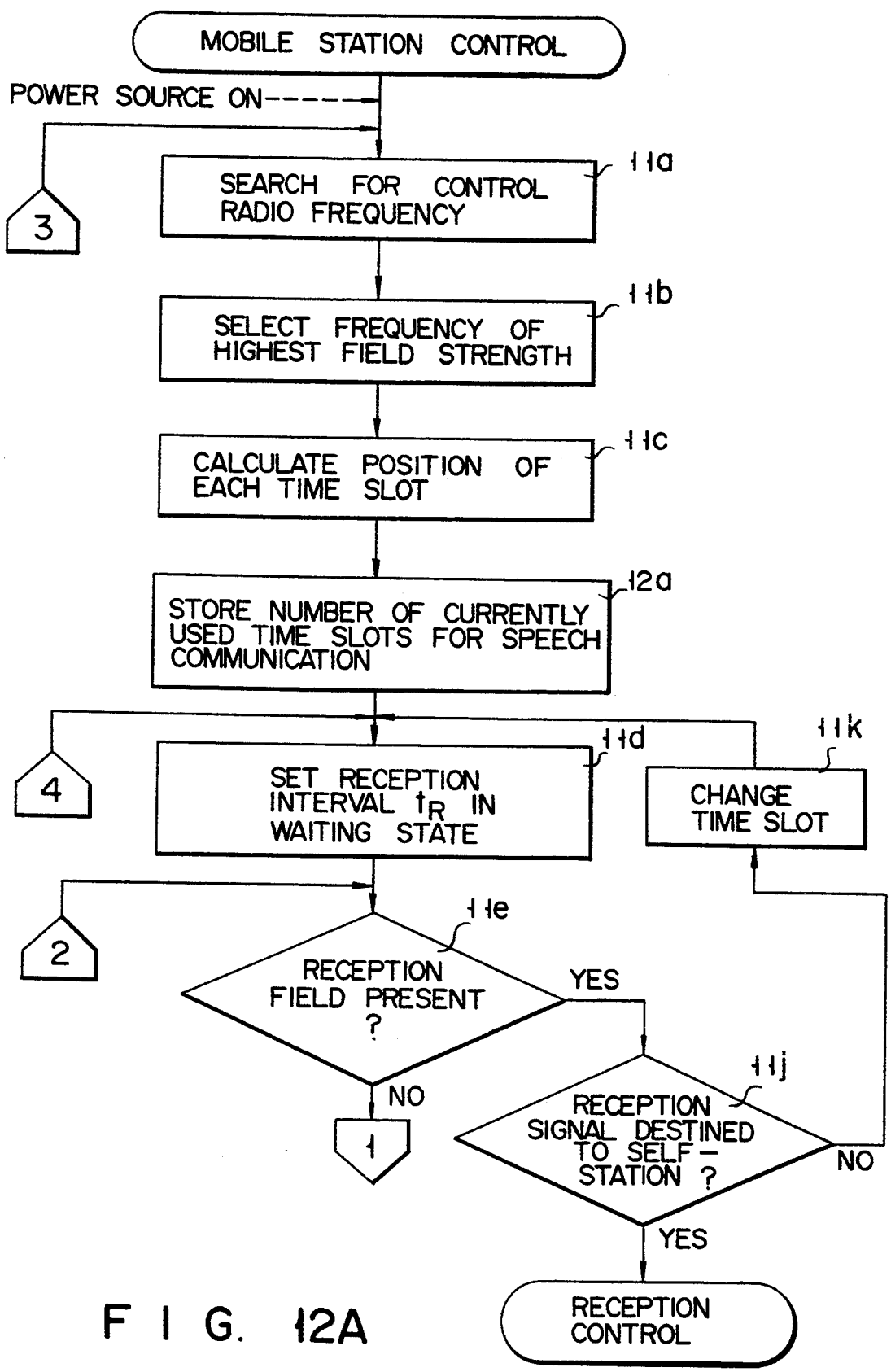
F I G. 12A

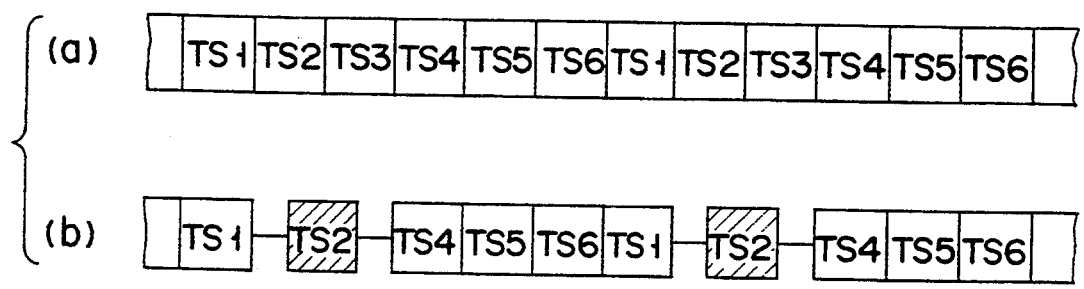
F I G. 13

UNUSED TIME SLOT DETECTION AND SELECTION IN A MOBILE RADIO COMMUNICATION SYSTEM

This is a continuation of application Ser. No. 07/727,583, filed Jul. 9, 1991, now U.S. Pat. No. 5,278,835.

BACKGROUND OF THE INVENTION

1. Field of the Invention

The present invention relates to a mobile radio communication system such as a portable radio telephone system or a vehicle telephone system and, more particularly, to a communication system based on a multichannel access scheme.

2. Description of the Related Art

As a system of this type, for example, a cellular portable radio telephone system is available. This system will be described in detail later in comparison with the embodiments of the present invention.

In a system of this type (i.e., a cellular portable radio telephone system), the most important subject is associated with the office service capacity. In a conventional cellular portable radio telephone system, the transmission output of each of base stations BS1 to BSn is set to be as large as several watts to ensure a relatively large wide radio communication zone range. For this reason, it is difficult to take full advantage of the technique of so-called frequency reuse, i.e., a concurrent use of the same frequency within the service area of the system. Therefore, the office service capacity of the system must be set to be relatively small. That is, the utilization efficiency of a radio frequency is low.

Under the circumstances, in recent years, the following two schemes have mainly been studied to increase the office service capacity of a system. In one scheme, the transmission output of each base station is set to be small to increase the number of radio zones. According to this scheme, since the reuse of a radio frequency can be satisfactorily performed, the office service capacity can be increased. In this scheme, however, since the number of radio zones is increased, a large number of base stations must be installed. As a result, the size and cost of the system itself are greatly increased.

In the other scheme, both a control signal and a speech signal are converted into digital signals, and the digital communication speech signal is time-divisionally multiplexed to be transmitted by the TDMA (Time Division Multiple access) method. According to this scheme, the radio frequency is frame-formatted, and the frame is divided into, e.g., six time slots so that these time slots are respectively used as speech channels. If this scheme is employed, the office service capacity can be increased six times that of a conventional system.

In a conventional system using the above-described scheme, however, a control station CS collectively manages not only each radio frequency but also the time slots of each radio frequency. For this reason, the following problems (1) to (3) are posed.

(1) Since a large number of speech channels including the respective time slots are collectively and concentrically managed by the control channel CS, the control station is required to have a large processing capacity.

(2) With an increase in number of base stations or changes of the installation positions of base stations, the management data of each base station in the control station CS must be updated. For this reason, it is not easy to increase the number of base stations or change the installation positions of base stations. That is, flexibility with respect to changes in the system is low.

(3) Even if a small- or medium-sized system having relatively small numbers of base stations and mobile stations is to be constructed, a large control station is required, thus posing a problem in terms of economy.

SUMMARY OF THE INVENTION

It is an object of the present invention to provide a digital mobile radio communication scheme which allows omission or simplification of a control station so that no large apparatus is required and high flexibility can be ensured with respect to changes in system, and which provides an economical advantage and can be suitably applied to a small- or medium-sized system. It is an object of the present invention to provide a mobile radio communication system in which interference between time slots does not easily occur.

That is, it is an object of the present invention to simplify the arrangement of the system and improve its flexibility in operation by designing the system such that management of control radio channels can be performed without using a control station.

It is another object of the present invention to provide a mobile radio communication system in which the power consumption of each mobile station in a waiting 10 state is reduced to prolong the service life of a battery in each mobile station.

A mobile radio communication system of the present invention includes a plurality of base stations connected to a network through wire lines, respectively, and a plurality of mobile stations respectively connected to the base stations through radio channels. A plurality of radio frequencies are shared by the base and mobile stations. At least one of transmission signals having these radio frequencies has a format of a time frame constituted by a plurality of time-divisionally multiplexed time slots. In addition, at least either of the base and mobile stations includes a use state determining means for determining the use states of each of the radio frequencies and each of the time slots on the basis of a received wave, a radio channel determining means and a radio channel establishing means. On the basis of a determination result provided by the use state determining means, a radio frequency and a time slot for connecting the base and mobile stations by radio are determined. Thereafter, a radio channel based on the determined radio frequency and time slot is established between the base and mobile stations.

The system is characterized in that in determination of a radio channel, if the use state determining means determines that a currently used time slot is present in one time frame, the position of a time slot to be used next is determined with reference to the position of the currently used time slot, and if it is determined that no currently used time slot is present in one frame, a time slot to be used next is set at an arbitrary position in one time frame.

The present invention is further characterized in that if the use state determining state determines that there is an interval in which a plurality of free time slots can be set between currently used time slots, a time slot to be used next is set at a middle position, in this interval, which is not adjacent to the currently used time slots.

In order to achieve another object, according to the present invention, there is provided a mobile radio communication system wherein at least one control radio frequency is possessed by each of the base and mobile stations, and a transmission signal based on each of the control radio frequencies is set as a time frame constituted by a plurality of time-divisionally multiplexed time slots, and each of the mobile stations includes means for setting a position of a control time slot, which is used to communicate a control signal with a corresponding one of the base stations when a radio channel is to be connected, on the basis of a signal transmitted from the base station to the mobile station at the control radio frequency, and also includes battery saving means. The battery saving means sets the mobile station in a reception state only in a specific interval of each control time slot set by the means in a waiting state, and sets the mobile station in a non-reception state in other intervals. That is, the battery saving means sets the mobile station in a reception state only for a period of time required to detect arrival of a wave within a reception interval of a time slot, of the respective control time slots, which is used for a reception operation, and sets the mobile station in a non-reception state in other intervals.

According to the present invention, the use states of each radio frequency and each time slot are determined in each base station or each mobile station, and a radio frequency and time slot to be used next are determined from the determined result. A radio channel based on the determined radio frequency and time slot is established between a given base station and a corresponding mobile station. That is, a series of control operations are completely performed in the base station or the mobile station in order to connect them through a radio channel. As a result, a control station for collectively managing radio channels can be omitted or simplified, and hence the arrangement of the system can be simplified accordingly. In addition, even if a new base station is installed or the position of a base station is changed, the position of the base 10 station need not be registered in a control unit. For this reason, it is relatively easy to change the system. That is, a flexible system can be constructed. Since no control station is required, small-to-medium-sized systems can be constructed at low cost.

Furthermore, a free slot can be determined without any difficulty regardless of whether currently used time slots are present in one time frame or all the time slots in one time frame are free.

Moreover, when there is an interval in which a plurality of free time slots can be set between currently used time slots, a time slot to be used next is set at the middle position in the interval. With this operation, even if the position of the time slot to be used next is shifted due to, e.g., variations in frequency in an oscillation source or the influences of fading, interference with other currently used time slots can be reduced. Therefore, it is possible to provide a system which is relatively free from radio interference.

According to the present invention, since control radio channels, each having a time frame format, are managed in the base and mobile stations, no control station for managing control channels is required. This allows simplification of the system arrangement.

In addition to the above-described effects, in the communication system of the present invention, since a control radio frequency is received by each mobile station in a waiting state only in a specific reception interval, the power consumption of each mobile station can be greatly reduced as compared with the case i.e., the conventional system in which each mobile station always receives a control radio frequency. Therefore, especially the service life of a battery in each mobile station can be prolonged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 7 are views for explaining the first embodiment of the present invention; in which FIG. 1 is a schematic view showing an arrangement of a mobile radio communication system;

FIG. 2 is a block diagram showing an arrangement of a mobile station in the system;

FIG. 3 is a block diagram showing an arrangement of a base station in the system;

FIGS. 4(a) to 4(c) are views showing the signal formats of signals to be transmitted at a radio frequency for speech communication;

FIGS. 5A and 5B are flow charts showing the control sequences and contents of control circuits in a base station and a mobile station;

FIGS. 6(a), 6(b), 6(c), 6(d), 7(a), 7(b), and 7(c) are timing charts for explaining an operation of the first embodiment;

FIGS. 8A, 8B, 9(a), 9(b), 9(c), and 9(d) are views for explaining the second embodiment of the present invention; in which FIGS. 8A and 8B are flow charts showing the control sequence and contents of a control circuit in a mobile station;

FIGS. 9(a) to 9(d) are timing charts for explaining an operation of the second embodiment;

FIGS. 10(a), 10(b), and 11 are views for explaining the third embodiment of the present invention; in which FIGS. 10(a) and 10(b) are timing charts for explaining an operation of the third embodiment;

FIG. 11 is a flow chart showing the control sequence and contents of a control circuit in a mobile station;

FIGS. 12A and 12B are flow charts showing the control sequence and contents of a control circuit in a mobile station in the fourth embodiment of the present invention;

FIGS. 13(a) and 13(b) are timing charts for explaining a modification of the present invention;

DETAILED DESCRIPTION OF THE PREFERRED EMBODIMENTS

Comparison with prior art

Figure 14:
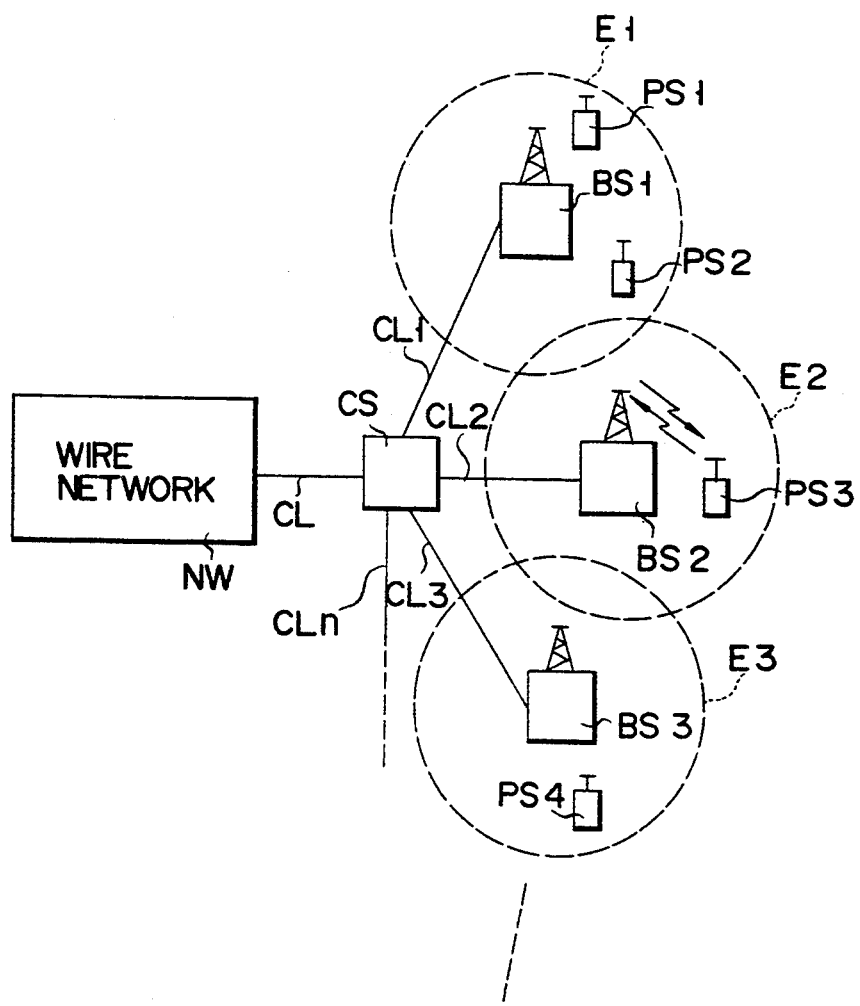
FIG. 14 is a schematic view showing a conventional mobile radio communication system.

FIG. 14 is a schematic view showing an arrangement of a cellular portable radio telephone system. This telephone system comprises a control station CS connected to a wire network NW, a plurality of base stations BS1 to BSn connected to the control station CS through wire lines CL1 to CLn, respectively, and a plurality of mobile stations PS1 to PSm connected to predetermined base stations by radio. The base stations BS1 to BSn respectively form radio zones E1 to En in different areas. The mobile stations PS1 to PSm are connected through radio channels to the base stations in the radio zones in which they are located, and can be further connected to the wire network NW through the base stations and the control station CS.

In the telephone system, the base stations BS1 to BSn and the mobile stations PS1 to PSm share a plurality of radio frequencies. That is, when an outgoing call is generated or an incoming call is received, a free radio frequency is selected from these radio frequencies to connect one of the base stations BS1 to BSn to a corresponding mobile station through a radio channel.

Figure 15:
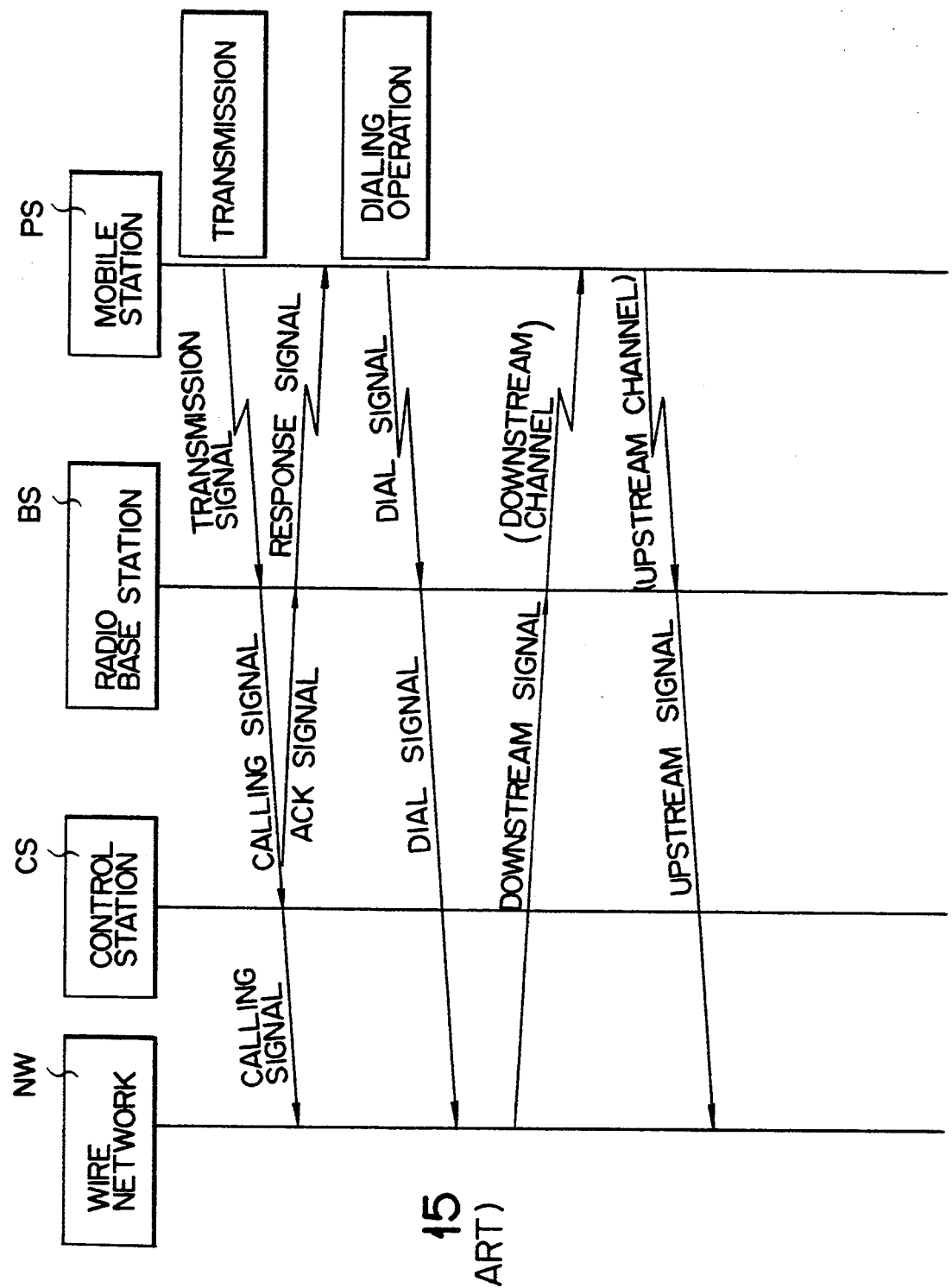
FIG. 15 is a view for explaining the calling sequence of the conventional mobile communication system.

Assume that a hook switch is turned on in the mobile station PS3 to generate an outgoing call. In this case, the mobile station PS3 selects a control radio frequency first, and transmits/sends a transmission signal including the ID code of the station PS3. The transmission signal is then transmitted to the base station B2 through a control channel established by the control radio frequency, as indicated by a speech communication sequence in FIG. 15. During the waiting state, the base station BS2 monitors the generation of an outgoing call through the control channel. Upon reception of the transmission signal from the mobile station PS3 in this state, the base station BS2 generates a ringing signal including the ID codes of the mobile station PS3 and the base station BS2 and sends the signal to the control station CS.

The control station CS checks from the ID codes included in the ringing signal whether the outgoing call is destined to its own system. If the outgoing call is destined to the system, the control station CS selects a free radio frequency from a plurality of speech radio frequencies which the system has, and sends an ACK signal including information for designating this radio frequency (i.e., speech channel designating information) to the base station BS2. Upon reception of the ACK signal from the control station CS, the base station BS2 generates a response signal including the speech channel designating information and the IC code of the mobile station PS3 as a transmission source, and transmits the signal to the mobile station PS3 through the control channel.

Upon reception of the response signal, the mobile station PS3 performs training in accordance with the speech channel designating information included in the signal so as to establish a speech channel with the base station BS2 at the above-mentioned radio frequency. When the speech channel is established by this training, the ringing signal is transmitted from the control station CS to the wire network NW. In response to the ringing signal, the wire network NW transmits a signal for requesting a dial signal to the mobile station PS3 through the control station CS and the base station BS2. In response to this dial signal transmission request, the mobile station PS3 displays that a dialing operation can be performed.

When a caller (user) confirms this display and inputs the dial number of a callee by using dial keys, the mobile station PS3 transmits a dial signal corresponding to the dial number to the base station BS2 through the radio speech channel. Upon reception of the dial number, the base station BS2 transfers the dial number to the wire network NW through the control station CS. With this operation, a switching operation is performed in the wire network NW to ring the telephone of the callee with which the caller desires to communicate. When the callee performs an off-hook operation (picking up the telephone), a speech channel (channel is formed (channel connection) between the cellee's telephone and the caller's mobile station PS3. Subsequently, speech communication can be performed between the callee's telephone and the mobile station PS3 through this communication channel.

A plurality of embodiments of a communication system of the present invention will be described below in comparison with the prior art described above.

First embodiment

A mobile radio communication system of this embodiment is characterized in that all radio frequencies for communication respectively have time frame formats to allow time-division multiplex transmission of speech signals, and determination of the use states of each radio frequency and its time slots and selection thereof are performed by each mobile station.

Figure 4:
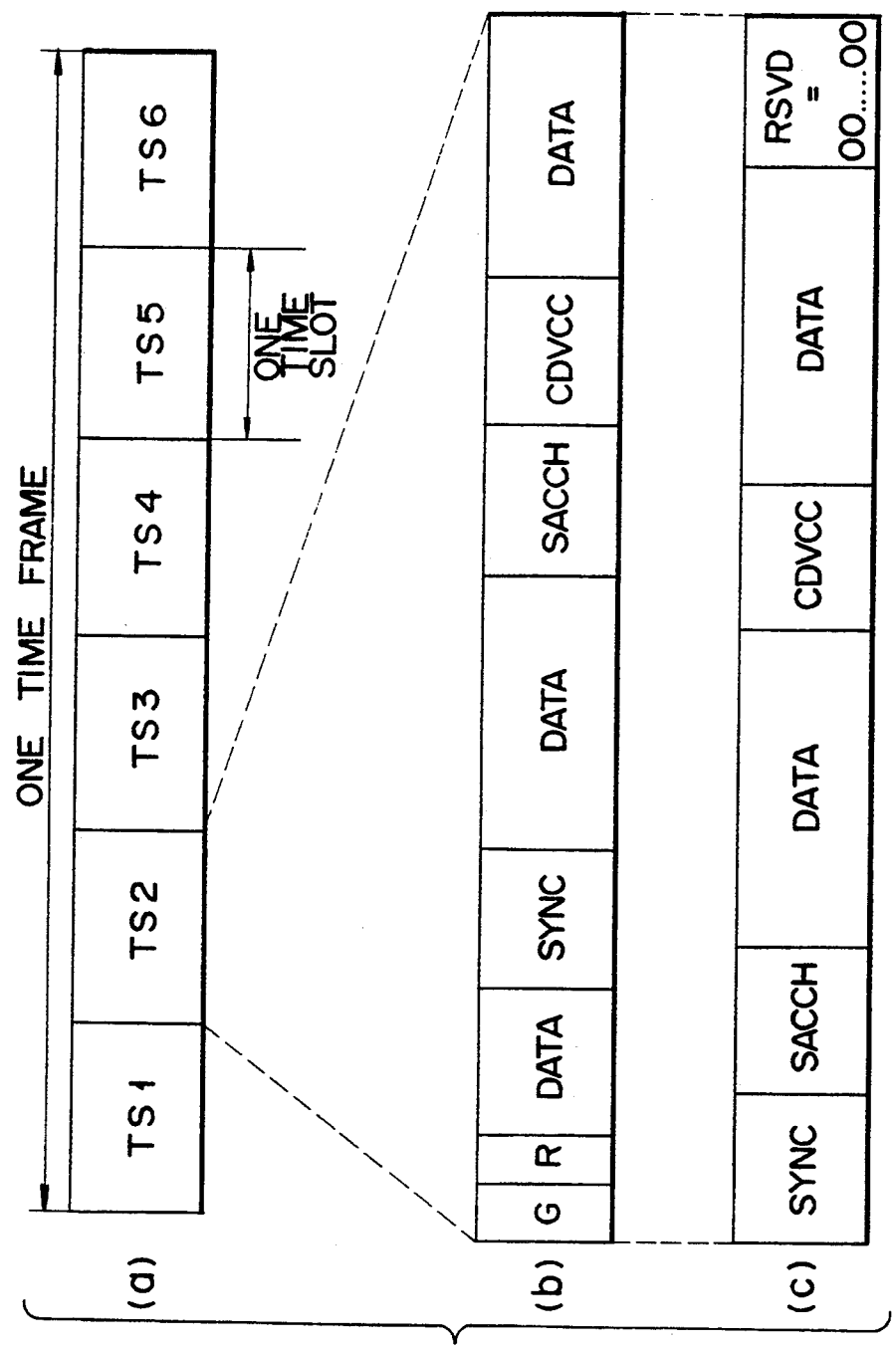

FIGS. 4(a) to 4(c) show the signal formats associated with the above-mentioned radio frequency for speech communication. As shown in FIG. 4(a), one time frame is divided into six time slots TS1 to TS6. When transmission of signals from mobile stations PSS1 to PSSm to base stations BSS1 to BSSn is to be performed, these time slots TS1 to TS6 have a format as shown in FIG. 4(b). When transmission of signals from the base stations BSS1 to BSSn to the mobile stations PSS1 to PSSm is to be performed, the time slots have a format as shown in FIG. 4(c). More specifically, in the format shown in FIG. 4(b), a guard time G and a ramp time R are arranged at the start position, and then a sync word SYNC, data DATA, a control signal SACCH, a call code CDVCC, and data DATA are sequentially arranged in the order named. In the signal format shown in FIG. 4(c), a sync word SYNC is arranged at the start position, and then a control signal SACCH, data DATA, a call code CDVCC, and data DATA are subsequently arranged in the order named. In addition, a reserve bit RSVD is arranged at the end position of this signal format.

As shown in, e.g., FIG. 1, the mobile radio communication system of this embodiment comprises a plurality of base stations BSS1 to BSSn connected to a wire network NW through wire lines CL1 to CLn, respectively, and a plurality of mobile stations PSS1 to PSSm to be used within radio zones E1 to En respectively formed by the base stations BSS1 to BSSn.

Figure 2:
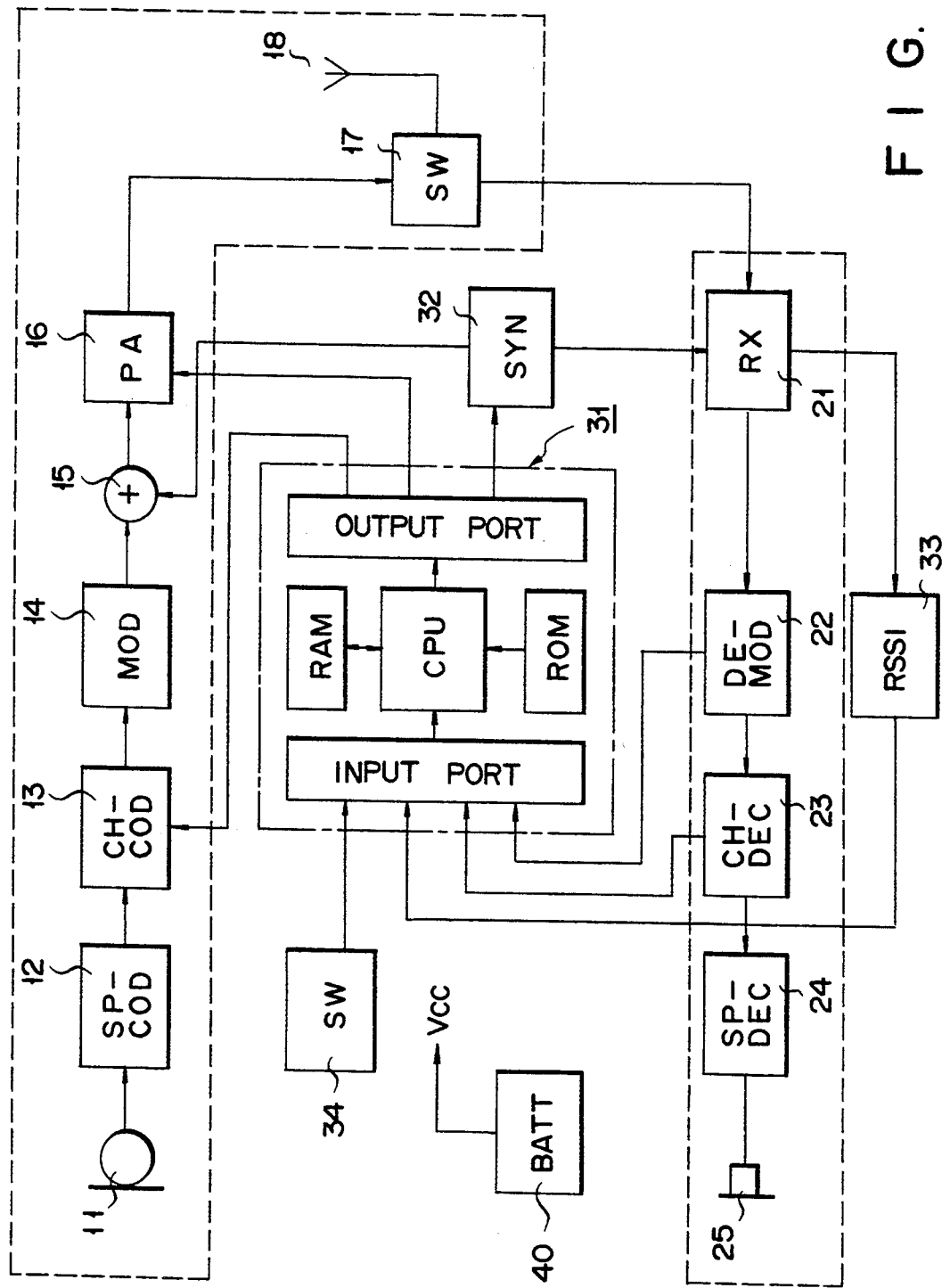

FIG. 2 is a block diagram showing a circuit arrangement associated with the mobile stations PSS1 to PSSm. Each of the mobile stations PSS1 to PSSm is roughly divided into transmission and reception systems respectively enclosed with dotted lines, and a control system for controlling these two systems. Note that a power source is an externally mounted battery 40.

The transmission system comprises a transmitter 11, a speech coder (SPCOD) 12, an error correction coder (CHCOD) 13, a digital modulator (MOD) 14, an adder 15, a power amplifier (PA) 16, a high-frequency switch (SW) 17, and an antenna 18. The speech coder 12 codes a speech signal output from the transmitter 11. The error correction coder 13 performs error correction coding of the digital speech signal output from the speech coder 12 and a digital control signal output from a control circuit 31 (to be described later). The digital modulator 14 generates a modulated signal corresponding to the digital transmission signal output from the error correction coder 13. In the adder 15, the modulated signal is added to a carrier output from a frequency synthesizer 32 to be frequency-converted. The radio transmission signal output from the adder 15 is amplified by the power amplifier 16 to have a predetermined transmission power. The high-frequency switch 17 is kept ON only during a period corresponding to a transmission time slot designated by the control circuit 31. As a result, during this period, the radio transmission signal output from the power amplifier 16 is supplied to the antenna 18 to be transmitted to a corresponding one of the base stations BSS1 to BSSm.

The reception system comprises a receiver (RX) 21, a digital demodulator (DEM) 22, an error correction demodulator (CHDEC) 23, a speech decoder (SPDEC) 24, and a receiver 25. The receiver 21 performs frequency conversion of a radio reception signal received through the antenna 18 and the high-frequency switch 17 in a predetermined time slot. The digital demodulator 22 establishes bit and frame synchronization with respect to the reception signal output from the receiver 21, and supplies the resulting sync signal to the control circuit 31. The error correction demodulator 23 performs error correction decoding of the digital demodulated signal output from the digital demodulator 22. Thereafter, a digital reception signal obtained by this error correction decoding is output to the speech decoder 24, and the digital control signal is supplied to the control circuit 31. The speech decoder 24 decodes the digital speech signal. As a result, the analog reception signal restored by this decoding operation is amplified and output from the receiver 25.

The control system comprises the control circuit (CONT) 31, the frequency synthesizer (SYN) 32, a reception field strength detector (RSSI) 33, and a send request switch 34. The frequency synthesizer 32 generates a frequency corresponding to a radio channel designated by the control circuit 31. The reception field strength detector 33 detects the reception field strength of a radio wave transmitted from the base stations BSS1 to BSSn, and supplies the detection signal to the control circuit 31.

The control circuit 31 is a circuit having, e.g., a microcomputer as a main control section and including a speech channel use state determining means, a speech channel selecting means, and a speech channel establish control means as control functions.

The use state determining means receives waves transmitted from a corresponding one of the base stations BSS1 to BSSn in units of radio frequencies when the send request switch 34 is operated, and determines the presence/absence of a free time slot on the basis of the reception field strength of each wave. If there is a free time slot, the use state determining means stores the corresponding time slot number in an internal RAM.

The speech channel selecting means selects a proper time slot number from the free time slot numbers stored in the internal RAM.

The speech channel establish control means transmits the free time slot selected by the speech channel selecting means to the corresponding base station to establish a speech channel using this free time 10 slot between the mobile station and the base station.

Figure 3:
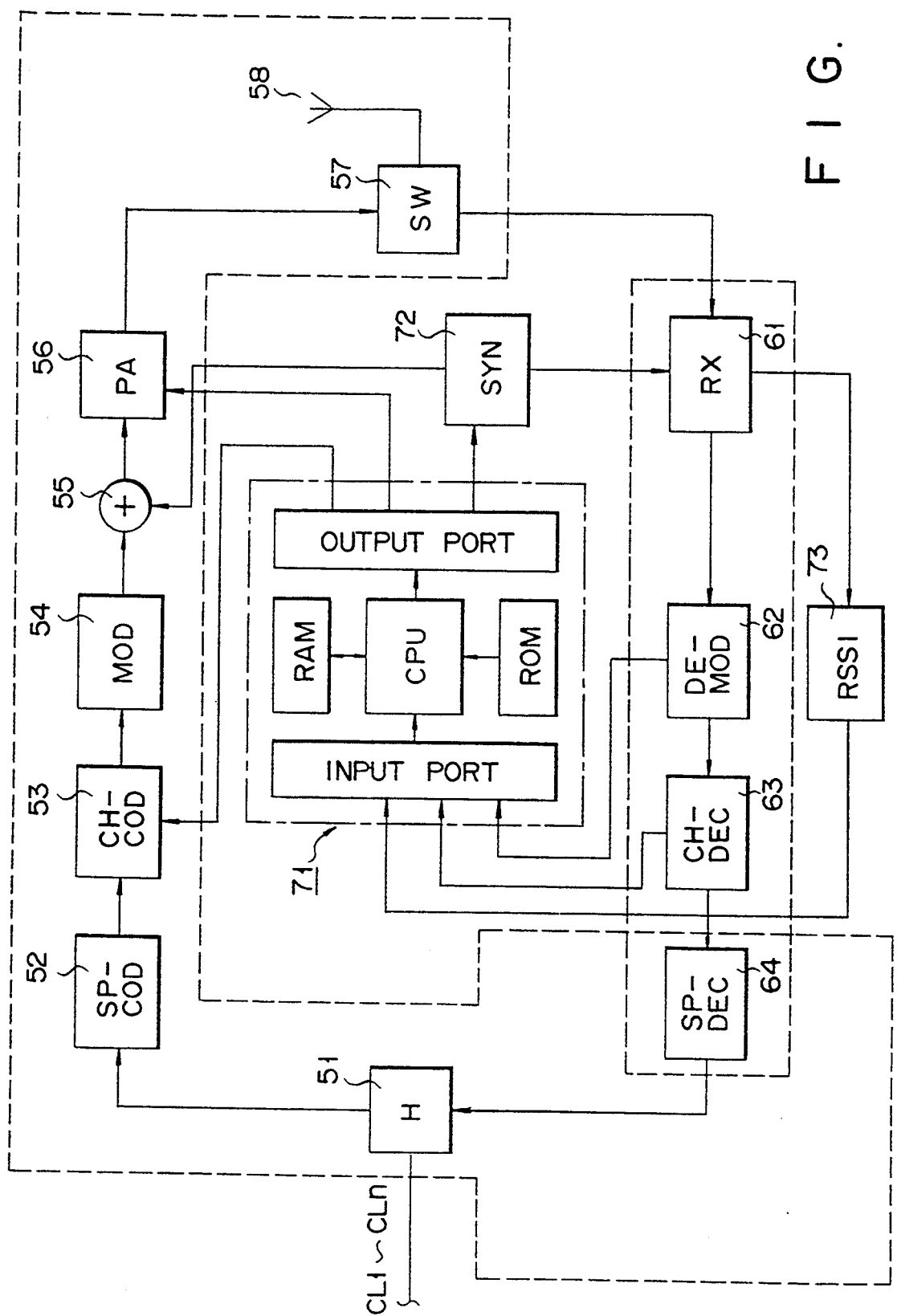

Each of the base stations BSS1 to BSSn has an arrangement shown in FIG. 3. Similar to the mobile stations PSS1 to PSSm, each of the base stations BSS1 to BSSn is roughly divided into transmission and reception systems respectively enclosed with dotted lines, and a control system.

The transmission system comprises a hybrid circuit 51, a speech coder (SPCOD) 52, an error correction coder (CHCOD) 53, a digital modulator (MOD) 54, an adder 55, a power amplifier (PA) 56, a high-frequency switch (SW) 57, and an antenna 58. The speech coder 52 codes a speech signal transmitted from the wire network side. The error correction coder 53 performs error correction coding of the digital speech signal output from the speech coder 52 and a digital control signal output from a control circuit 71 (to be described later). The digital modulator 54 generates a modulated signal corresponding to the digital transmission signal output from the error correction coder 53. In the adder 55, the modulated signal is added to a high-frequency signal output from a frequency synthesizer 72 to be converted into a radio channel frequency. The radio transmission signal output from the adder 55 is amplified by the power amplifier 56 to have a predetermined transmission power. The high-frequency switch 57 is kept on only during a period corresponding to a transmission time slot designated by the control circuit 71. As a result, during this period, the radio transmission signal output from the power amplifier 56 is supplied to the antenna 58 to be transmitted to a corresponding one of the mobile stations PSS1 to PSSm.

The reception system comprises a receiver (RX) 61, a digital demodulator (DEM) 62, an error correction demodulator (CHDEC) 63, and a speech decoder (SPDEC) 64. The receiver 61 performs frequency conversion of a radio reception signal received through the antenna 58 and the high-frequency switch 57 in a predetermined time slot. The digital demodulator 62 establishes bit and frame synchronization with respect to the reception signal output from the receiver 61, and supplies the resulting sync signal to the control circuit 71. The error correction decoder 63 performs error correction decoding of the digital demodulated signal output from the digital demodulator 62. The digital speech signal obtained by this error correction decoding is output to the speech decoder 64, while the digital control signal is supplied to the control circuit 71. The speech decoder 64 decodes the digital speech signal. The analog speech signal restored by this decoding operation is transmitted to a corresponding one of the wire lines CL1 to CLn through the hybrid circuit 51.

The control system comprises the control circuit (CONT) 71, the frequency synthesizer (SYN) 72, and a reception field strength detector (RSSI) 73. The frequency synthesizer 72 generates a radio frequency designated by the control circuit 71. The reception field strength detector 73 detects the reception field strength of a radio transmission signal transmitted from a corresponding one of the mobile stations PSS1 to PSSm, and supplies the detection signal to the control circuit 71.

The control circuit 71 has, e.g., a microcomputer as a main control section and includes a means for performing communication of a control signal between the wire network NW and a corresponding mobile station when an outgoing call is generated or an incoming call is received, and a speech channel establish control means. The speech channel establish control means performs control to establish a speech channel, based on a time slot corresponding to a time slot number transmitted from a corresponding mobile station, between the base station and the mobile station.

An operation of the communication system of this embodiment having the above-described arrangement will be described below.

In a waiting state, each of the mobile stations PSS1 to PSSm repeatedly monitors a reception signal and a transmission operation in steps 5a and 5b in FIG. 5A. When a reception signal from a corresponding one of the base stations BSS1 to BSSn arrives, the mobile station executes reception control.

Assume that a caller operates the send request switch 34 of the mobile station PSS5 in the radio zone E4 of the base station BSS4. In this case, transmission control is started in the mobile station PSS5. The control circuit 31 in the mobile station PSS5 sets the value of a register k to be "1" in step 5c. In step 5d, the synthesizer 32 is controlled to set a state in which a radio frequency fR1 of a plurality of reception radio frequencies fRk (k=1, 2, ... ) can be received. In step 5e, it is checked from the reception field strength of the frequency fR1 whether all the time slots TS1 to TS6 are free. In step 5f, it is checked whether any of the time slots is free.

Assume that it is determined that all the time slots TS1 to TS6 of the reception radio frequency fR1 are used, as shown in FIG. 6(a). In this case, the control circuit 31 of the mobile station PSS5 increments the value of the register k (k=k+1) in step 5g. The flow then returns to step 5d to set a state in which the reception radio frequency fR2 corresponding to k=2 can be received. In steps 5e and 5f, the use states of the time slots TS1 to TS6 of the reception radio frequency fR2 are determined. If none of the time slots TS1 to TS6 of the reception radio frequency fR2 are free, the value of the register k is incremented in step 5g, and the flow returns to step 5d to receive the reception radio frequency fR3, and its use state is checked in the same manner as described above. Subsequently, the control circuit 31 repeats the above-described control processing until it finds any free time slot of the time slots TS1 to TS6 of a received radio frequency.

Assume that a free time slot is found in, e.g., the reception radio frequency fR2, although not all of the time slots TS1 to TS6 are free, as shown in FIG. 6(b). In this case, the control circuit 31 detects a sync word from a reception signal in the currently used time slot TS1 of the reception radio frequency fR2. The control circuit 31 then calculates the position (as shown in FIG. 6(c)) of the free time slot TS2 following the time slot TS1 with reference to the position of the sync word, and stores information corresponding to the position of the time slot TS2 together with information representing the reception radio frequency fR2 in the internal RAM (see step 5h). In step 5i, the control circuit 31 controls the synthesizer 32 to set a control channel C-CH, and generates a transmission signal including information representing the position of the free time slot and the reception radio frequency and the ID code of the mobile station PSS5. The control circuit 31 then transmits this transmission signal to the base station BSS4 through the control channel C-CH. Note that a predetermined control radio frequency is used as the control channel in this case.

Figure 5B:
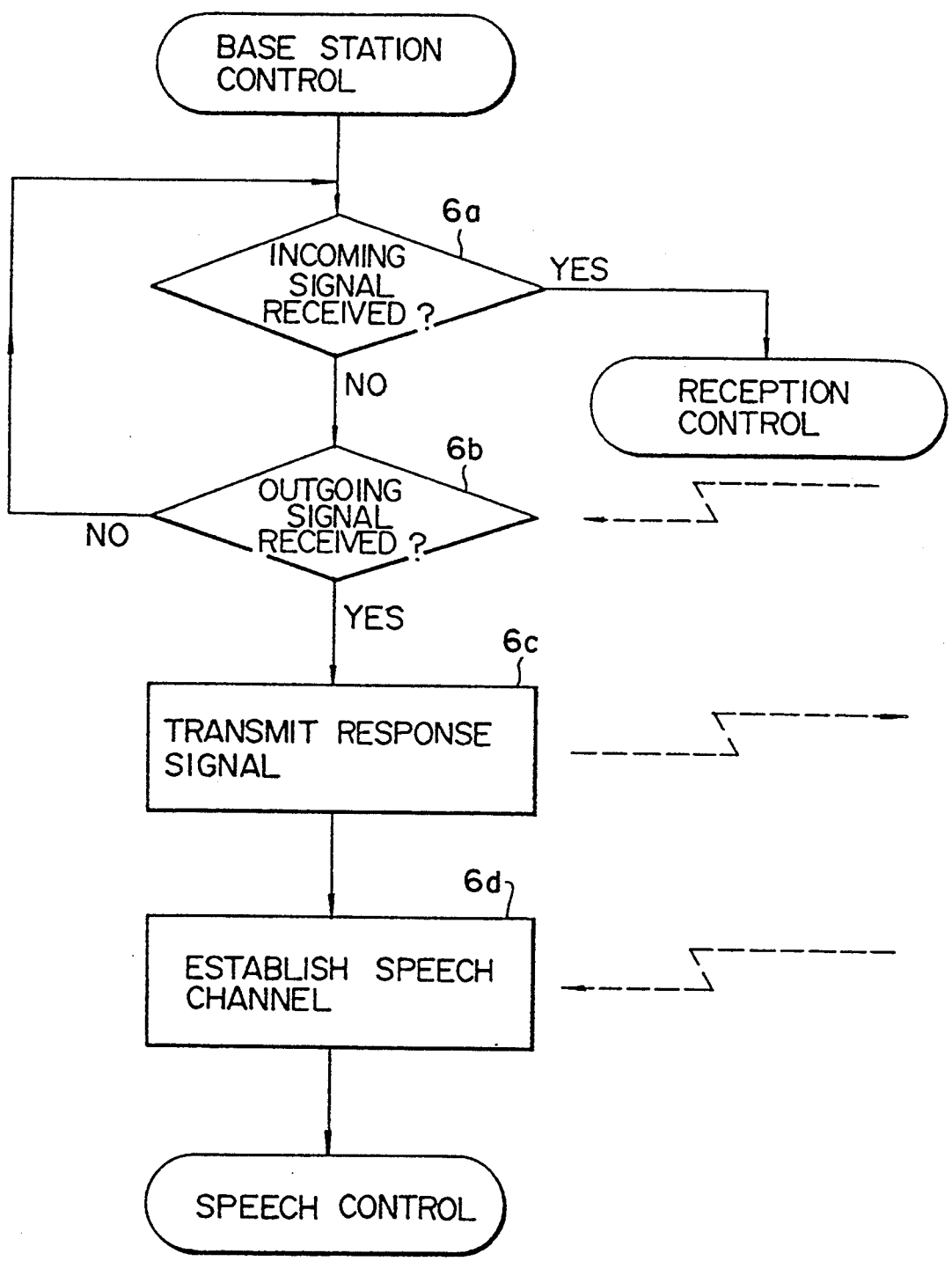

As shown in FIG. 5B, in a waiting state, the control circuit 71 in each of the base stations BSS1 to BSSn repeatedly monitors a reception signal from the wire network NW (step 6a) and a transmission signal from a corresponding one of the mobile stations PSS1 to PSSm (step 6b). If a transmission signal from the mobile station PSS5 arrives in this state, the base station BSS4 generates a response signal including the ID code, of the mobile station PSS5, which is included in the transmission signal, in step 6c, and sends the response signal to the mobile station PSS5 through the control channel C-CH.

In response to this operation of the base station, the mobile station PSS5 monitors reception of the response signal from the base station BSS4 in step 5j while monitoring in step 5k whether a predetermined period of time elapses after the transmission signal is transmitted. Assume that the response signal is received within the predetermined period of time. In this case, a speech radio frequency fT2 corresponding to the previously stored reception radio frequency fR2 is set in the synthesizer 32, and the power amplifier 16 is kept ON only during a period corresponding to the free time slot TS2 to start transmission (step 51). If the response signal is not received within the predetermined period of time after transmission of the transmission signal is started, it is determined that a speech channel cannot be established by the currently used radio frequency and time slot. As a result, the flow returns to step 5d to select a radio frequency and a free time slot again.

In the base station BSS4, after the response signal is sent back, a reception radio frequency corresponding to the speech radio frequency designated by the transmission signal from the mobile station PSS5 is designated in the synthesizer 72, and the receiver 61 is kept in an operative state only during a period corresponding to the free time slot TS2.

With the above-described operation sequence, the base station BSS4 and the mobile station PSS5 are connected through a radio speech channel constituted by the radio frequencies fT2 and fR2 and the time slot TS2, as shown in FIG. 6(d). Subsequently, this radio speech channel is used as part of a speech path to perform speech communication.

Assume that in selection/control of a free time slot, as shown in FIG. 7(a), it is detected that no time slot of the reception radio frequency fR3 is currently used, i.e., all the time slots TS1 to TS6 are free. Whether all the time slots TS1 to TS6 are free is determined by monitoring whether reception field strengths corresponding to at least seven time slots are not continuously detected.

In this case, the position of a free time slot cannot be determined with reference to the position of a currently used time slot. For this reason, the control circuit 31 in the mobile station PSS5 shifts the flow from step 5e to step 5m. In step 5m, as shown in FIG. 7(b), the control circuit 31 sets a time corresponding to the length of one time slot at an arbitrary timing on the reception radio frequency fR3. In step 5n, the control circuit 31 stores this time as the time slot TS1 in the internal RAM. The control circuit 31 then inserts information representing the arbitrarily determined position of the time slot TS1 and information representing the reception radio frequency fR3 in the transmission signal, and transmits the resulting transmission signal to the base station BSS4. The subsequent operation is the same as that described above. As a result, as shown in FIG. 7(c), the mobile station PSS5 and the base station BSS4 are connected to each other through a radio speech channel constituted by the radio frequencies fT3 and fR3 and the time slot TS1.

As described above, according to the first embodiment, the use states of the time slots of each radio frequency are determined in each of the mobile stations PSS1 to PSSm when a transmission operation is to be performed, and a free time slot to be used next and a corresponding radio frequency are determined on the basis of this determination result and are transmitted to a corresponding one of the base stations BSS1 to BSSn. As a result, each of the mobile stations PSS1 to PSSm and a corresponding one of the base stations BSS1 to BSSn are connected to each other through a radio speech channel constituted by the free time slot and the radio frequency. According to this arrangement, therefore, radio speech channels can be independently managed by the respective mobile stations PSS1 to PSSm. That is, this arrangement does not require the control station CS for collectively managing radio speech channels, which is indispensable in the conventional system. This allows simplification of the arrangement of the system. In future, even if the installation positions of base stations are changed or the number of base station is increased, the original position information need not be registered again. Therefore, it is relatively easy to change the installation positions of base stations or increase the number of base stations. That is, the operation flexibility of the communication system can be improved.

In addition, according to the first embodiment, when the position of a free time slot is to be selected, it is checked whether all the time slots are free or not, and it is also checked whether a currently used time slot is present. If all the time slots are free, the time slot TS1 is set at an arbitrary timing. If there is a currently used time slot, the position of a free time slot is set with reference to the currently used time slot. For this reason, a free time slot can be reliably selected regardless of the presence/absence of a currently used time slot. Especially in the case wherein a currently used time slot is present, a free time slot can be accurately set without overlapping the currently used time slot.

Second embodiment

A communication system of this embodiment is characterized in that if it is determined that free time slots are present, it is checked whether three or more free time slots are present between currently used time slots, and if three or more free time slots are present, a time slot which is not adjacent to the currently used time slots is selected.

Figure 8A:
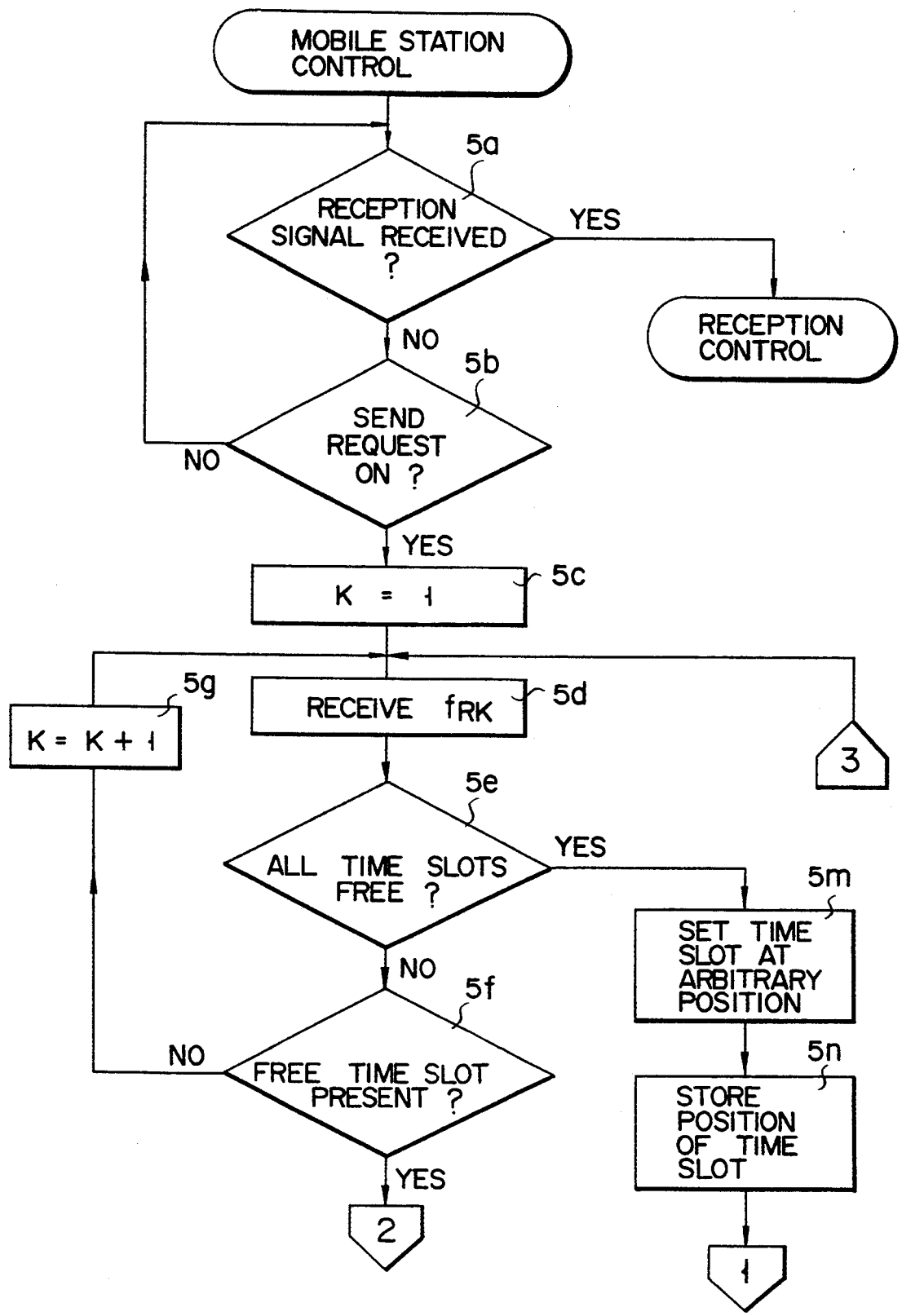
Figure 8B:
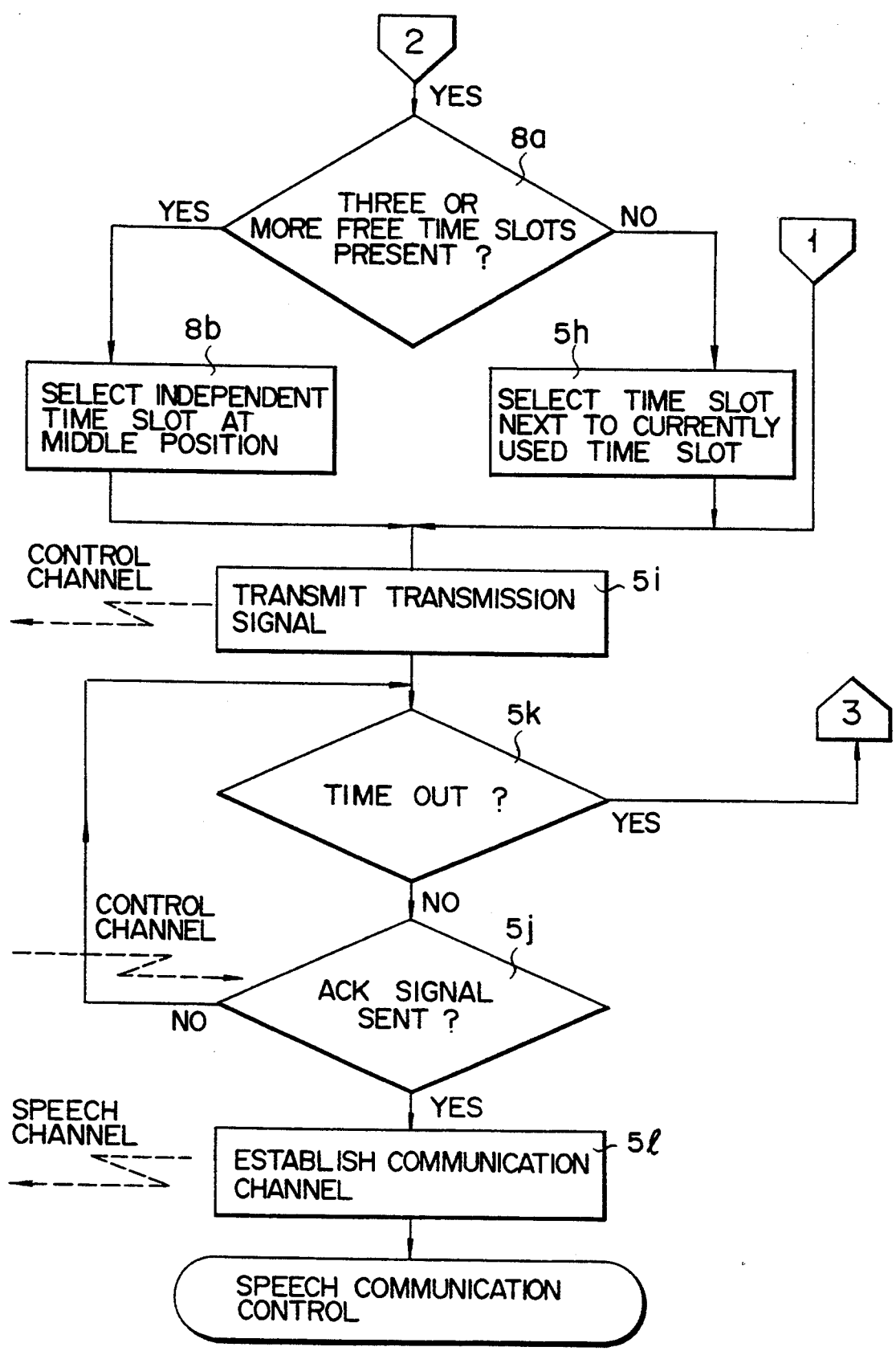

More specifically, as shown in FIGS. 8A and 8B, if a control circuit 31 of each of mobile stations PSS1 to PSSm determines in steps 5e and 5f that not all time slots TS1 to TS6 are free, but free time slots are present, the circuit 31 checks in step 8a whether there is an interval between currently used time slots in which three or more free time slots can be inserted. If there is no such an interval, the flow advances to step 5h to select a free time slot located next to a currently used time slot. If such an interval is present, the flow advances to step 8a. In step 8a, it is checked whether there is an interval between currently used time slots in which three or more free time slots can be inserted. If YES in step 8a, the control circuit 31 selects a free time slot, from the three or more time slots, which is not adjacent to the currently used time slots, and stores it (the interval) in the internal RAM.

A case wherein free time slots in a reception radio frequency fR2 are to be detected will be described below. Assume that only the time slot TS1 is currently used and other time intervals are not used, as shown in FIG. 9(b). In this case, the control circuit 31 selects the time slot TS4 located at a position separated from the time slot TS1, as shown in FIG. 9(c), and stores the selected time slot TS4 in an internal RAM.

Note that subsequent operation control from transmission of a transmission signal to the start of speech communication by means of the free time slot TS4 is the same as that in the first embodiment.

As described above, according to the second embodiment, if three or more free time slots are present between currently used time slots, a free time slot which is located in the middle of currently used time slots and is not adjacent thereto is selected. With this arrangement, even if the positions of time slots are shifted due to the influences of fading or due to a frequency drift in a reference oscillator for the mobile stations PSS1 to PSSm or the base stations BSS1 to BSSn, a proper speech communication can be performed with a radio channel without interference between time slots.

Third embodiment

A mobile radio communication system of this embodiment is characterized in that it has a plurality of control radio frequencies, and signals to be transmitted by using these control radio frequencies respectively have time frame formats, each constituted by a plurality of time-divisionally multiplexed time slots. The time slots of this time frame are classified into a reception time slot group and a transmission time slot group. Furthermore, in the communication system of this embodiment, similar to the management of speech radio frequencies and the respective time slots in each embodiment described above, management of these control radio frequencies and the respective time slots can be independently performed by base stations BSS1 to BSSn and the mobile stations PSS1 to PSSm.

More specifically, in a waiting state, each of the base stations BSS1 to BSSn uses a control radio frequency, of a plurality of control radio frequencies, which is assigned thereto, so as to periodically transmit frame sync information in which a unit pattern is inserted. Assume that the time frame of a control radio frequency has six time slots. In this case, as shown in FIG. 10(a), a wave modulated by the unit pattern is transmitted for a short time interval to prior to a time slot TSC1. Note that the unit pattern is constituted by, e.g., a combination of repetitive codes of "10" and the ID code of the corresponding base station.

In each of the mobile stations PSS1 to PSSm, when the power source switch is turned on, a control circuit 31 is reset to start an initial control operation. More specifically, as shown in FIG. 11, the control circuit 31 controls a synthesizer 32 in step 11a. With this control, the control circuit 31 sequentially receives waves of the plurality of control radio frequencies of the system, and detects their reception field strengths by a reception field strength detector 33. The control circuit 31 stores the detection values in the internal RAM. In step 11b, the maximum detection value is selected from the detection values of the reception field strengths. Assume that the maximum reception field strength is detected when a control radio frequency fRC1 is received. In this case, in step 11c, the control circuit 31 calculates the position of a time slot, of the time slots transmitted from the corresponding base station, which is to be received in a waiting state, on the basis of the control radio frequency fRC1. If, for example, time slots TSC1 to TSC3, of six time slots TSC1 to TSC6 of one frame, are assigned to reception, while the time slots TSC4 to TSC6 are assigned to transmission, the reception timing of the reception time slot TSC1 is calculated. The calculation of this reception timing is performed with reference to the reception timing of the frame sync information. At the same time, in step 11c, the positions of the transmission time slots TSC4 to TSC6 are calculated with reference to the reception timing of the frame sync information, and the calculation results are stored.

In step 11d, the control circuit 31 sets the reception interval in a waiting state to be part of the interval of the reception time slot TSC1. For example, as shown in FIG. 10(b), a start portion of the reception time slot TSC1 is set as a reception interval tR in a waiting state (waiting state reception interval). The length of the waiting state reception interval tR is set to correspond to the time required for the reception field strength detector 33 to detect a reception field strength.

When the initial settings are completed in the above-described sequence, the control circuit 31 of each of the mobile stations PSS1 to PSSm executes waiting operations in steps 11e to 11h. In step 11e, the control circuit 31 monitors whether the waiting state reception interval tR has come. Every time the waiting state reception interval comes, reception of the control radio frequency fRC1 is performed. In step 11f, it is checked whether a send request switch 34 is operated. If it is detected that the send request switch 34 is depressed, the control is transferred to transmission control processing. Note that this transmission control processing is performed in the same manner as described in, e.g., the first and second embodiments.

In step 11g, the control circuit 31 sets a receiver 21 and the reception field strength detector 33 in a nonoperative state after the waiting state reception interval tR, thus performing control for so-called battery saving. The interruption of this reception operation is held until the next waiting state reception interval tR. Providing that a current consumption in a reception operation is represented by IR, and a current consumption in a waiting state is represented by I0, an average current consumption I AVE of each of the mobile stations PSS1 to PSSn in a waiting state is given by the following equation:

$$I\,AVE = 1/(6tS + tC + tR) \times \{tR \times IR + (6tS + tC) \times I0\}$$

Since generally IR>>I0, the current consumption of each of the mobile stations PSS1 to PSSm is greatly reduced by the above-mentioned battery saving.

In step 11h, the control circuit 31 checks whether a predetermined interval t1 elapses after waiting state control based on the waiting state reception interval tR calculated in step 11d is started. If no reception field is detected in step 11e after the predetermined interval t1 elapses, it is determined that a wave having the control radio frequency fRC1 may not be received due to the movement of the corresponding mobile station. The flow then advances to step 11i. In step 11i, the reception timing is switched from the waiting state reception interval tR to a reception interval tC of frame sync information, and the reception of the wave having the control radio frequency fRC1 is confirmed on the basis of a detection value from the reception field strength detector 33. If it is confirmed that the wave is properly received, the flow returns to step 11e to correct the waiting state reception interval tR with reference to the reception timing of the properly received frame sync information. In contrast to this, if it is determined that a wave having a predetermined level or more is not received, the flow returns to step 11a to start the same routine again from selecting a control radio frequency. Note that in this case, if a control radio frequency having the second highest reception field strength has been stored in the previous initialization, a search for a control radio frequency may be omitted.

Assume that a call designation with respect to, e.g., the mobile station PSS1 is supplied from the wire network NW to the base stations BSS1 to BSSn during such a waiting operation. In response to the call designation, each of the base stations BSS1 to BSSn generates a reception signal including the ID code of the mobile station PSS1. In this case, each of the base stations BSS1 to BSSn checks whether a free time slot is present in each speech radio frequency. If a free time slot is present, each base station generates speech channel designation information representing this time slot and a corresponding radio frequency, and inserts this information in the reception signal. The reception signal is then inserted in the free reception time slot of each control radio frequency and is transmitted.

If the arrival of a wave is detected by the reception field strength detector 33 in the waiting state reception interval tR, each of the mobile stations PSS1 to PSSm prolongs the reception interval to the end of the reception time slot TSC1 to receive a reception signal in this interval. The control circuit 31 checks whether this reception signal is destined to the corresponding mobile station. If the signal is destined to the corresponding mobile station, the control is transferred to reception control processing. In this reception control processing, a reception response signal is generated and sent to the corresponding base station to establish a speech channel therewith.

If the reception signal is destined to another station, the mobile station PSS1 detects a reception field only for the short interval tR from the start portion of the next reception time slot TSC2. This operation is performed because when the base station calls another mobile station in the time slot TSC1, there is a possibility that the mobile station PSS1 is called in the next time slot TSC2. If a reception field is detected in the time slot TSC2, and the reception signal received in this time slot TSC2 is destined to the mobile station PSS1, the flow of processing advances to the next reception control operation. If the reception signal is not destined to the mobile station PSS1, detection of a reception field in the next time slot TSC3 is performed in the same manner as in the case wherein no reception field is detected in the time slot TSC1. If no reception field is detected in the time slot TSC2 or TSC3, the flow of processing returns to the waiting operation to perform a reception operation only for the start interval tR of the time slot TSC1. In addition, if no reception field destined to the mobile station PSS1 is detected in the time slot TSC3, the mobile station PSS1 is restored to the waiting operation.

If the send request switch 34 is operated in one of the mobile stations PSS1 to PSSm, the following transmission control is performed. The corresponding mobile station checks whether the transmission time slot TSC4 of a control radio frequency is free or not. If it is confirmed that the time slot TSC4 is free, the mobile station transmits a transmission signal to a corresponding one of the base stations BSS1 to BSSn by using the time slot TSC4. If the time slot TSC4 is currently used, it is checked whether the next time slot TSC5 is free. If it is free, the mobile station transmits the transmission signal by using the time slot TSC5. Similarly, if this time slot TSC5 is also currently used, it is checked whether the next time slot TSC6 is free. If it is free, this time slot TSC6 is used. Note that if all the time slots TSC4 to TSC6 are currently used, a busy state is notified to a user (caller). If, however, another control radio frequency can be used, the mobile station may be switched to this control radio frequency. Thereafter, if the presence of a free time slot of the transmission time slots TSC4 to TSC6 is confirmed, the corresponding time slot may be used.

When the transmission signal is to be transmitted, a search for a speech channel (i.e., table search) is performed, as described above with reference to the first and second embodiments. In the free speech channel selected and detected by this search, designated information and the ID code of the corresponding mobile station are inserted in the transmission signal.

As described above, according to the above embodiment, a plurality of control radio frequencies are available, and control channels constituted by time slots can be independently managed in the base stations BSS1 to BSSn and the mobile stations PSS1 to PSSm. Therefore, both control channels and speech channels can be managed without a control station. This allows a simple system arrangement. In addition, it is relatively easy to respond to the installation of new base stations or changes of the installation positions of the base stations BSS1 to BSSn, thereby providing a system having high flexibility in terms of operation.

Furthermore, according to this embodiment, in each of the mobile stations PSS1 to PSSm, a reception operation is performed only for the short interval tR, of the arbitrary reception time slot TSC1 in one time frame, required to detect the arrival of a wave, in a waiting state. In other intervals, the reception operation is interrupted. Therefore, the power consumption of each of the mobile stations PSS1 to PSSm in a waiting state can be greatly saved. This prolongs the service life of the battery 40 of each mobile station.

Fourth embodiment

In a communication system of this embodiment, in addition to a unique pattern (information), frame sync information which is transmitted by each of base stations BSS1 to BSSn in an interval tC includes information indicating the number of mobile stations with which the corresponding base station currently communicates through speech channels, and this sync information is transmitted to mobile stations. In each mobile station, the use state of the base station is determined from this frame sync information. If it is determined that all the time slots of each speech radio frequency currently used by the base station are currently used or only a small number of usable time slots remain, it is determined that this base station cannot be connected or is difficult to connect. In this case, a control radio frequency transmitted by another base station is searched.

More specifically, in each of the base stations BSS1 to BSSn, when frame sync information is to be transmitted at a control radio frequency, information representing the number of currently used time slots is inserted in addition to a unique pattern. In this case, since the number of time slots in one time frame of a speech radio frequency currently used by each base station is six, the number of currently used time slots is expressed by three bits.

Figure 12B:
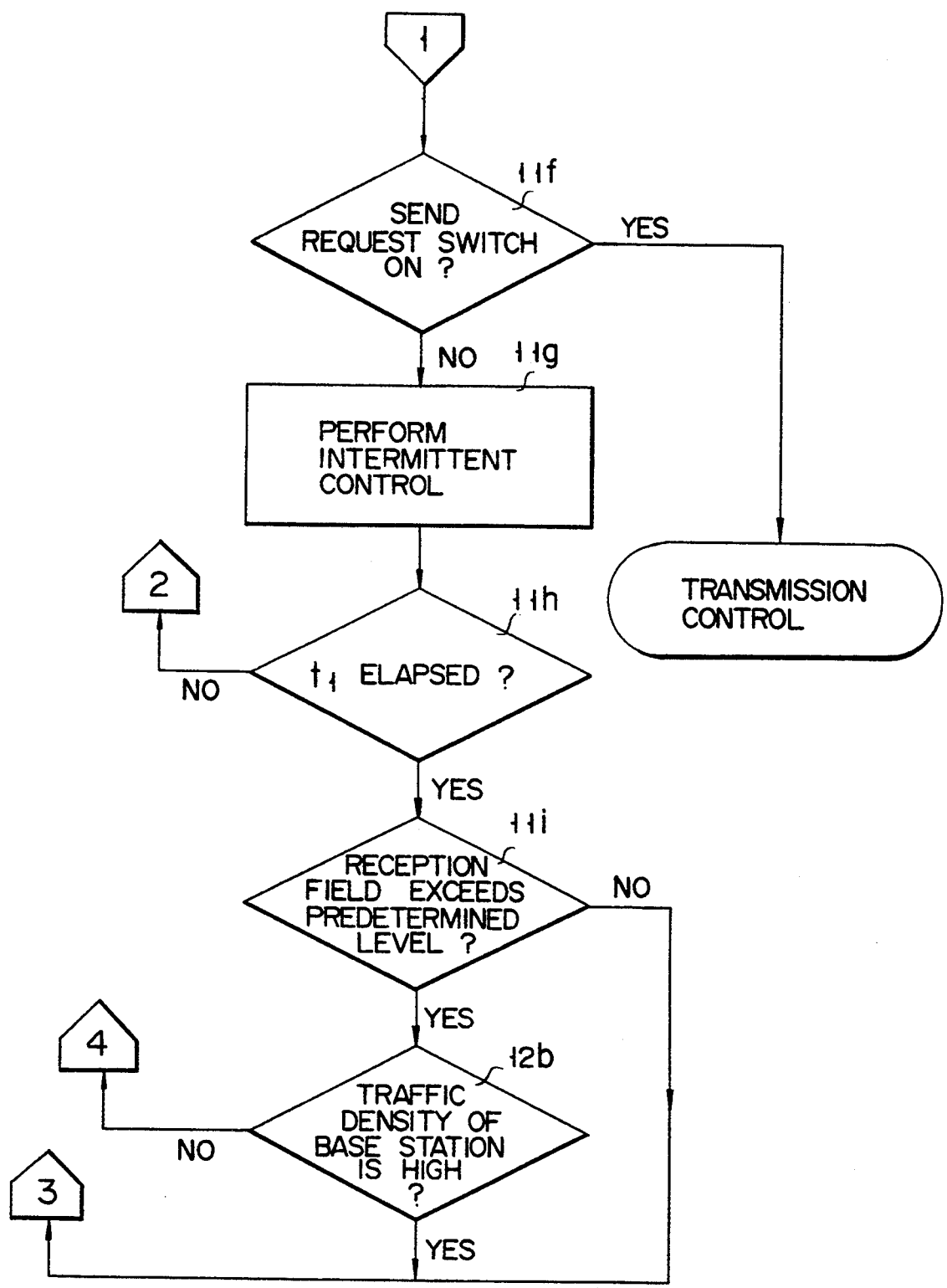

In each of mobile stations PSS1 to PSSm, as shown in FIGS. 12A and 12B, if a control radio frequency of the maximum electric field strength is selected in steps 11a and 11b, the positions of time slots TSC1 to TSC6 are estimated in step 11c with reference to a reception timing tC of the frame sync information transmitted at this control radio frequency. In step 12a, the information representing the number of currently used speech time slots, which is inserted in the frame sync information, is extracted and stored. In step 11d, a reception interval tR in a waiting state is obtained on the basis of the reception timing tC of the frame sync information. Subsequently, a waiting operation based on battery saving is executed.

During this waiting operation, in each of the mobile stations PSS1 to PSSm, the reception field strength of a currently received control radio frequency is determined in every predetermined interval t1 in step 11i. If it is determined that a wave having a sufficiently high field strength is received, the flow advances to step 12b. In step 12b, on the basis of the information representing the number of currently used speech time slots, which is stored in advance, it is checked whether the corresponding base station has free time slots enough to allow speech connection. If YES in step 12b, the flow returns to step 11d to correct the waiting state reception interval tR, and the waiting operation is continued. If NO in step 11b, the flow returns to step 11a to search for control radio frequencies transmitted from other base stations. If a frequency having a reception field strength exceeding a level which allows a communication is searched out among other control radio frequencies, this control radio frequency is selected, and a waiting operation is subsequently performed.

As described above, in this embodiment, each of the base stations BSS1 to BSSn transmits sync information including information representing its own use state. Each of the mobile stations PSS1 to PSSm checks the use state of a corresponding base station on the basis of the information included in the frame sync information. If it is determined that the traffic density of the corresponding base station is high, the mobile station searches for a control radio frequency transmitted from another base station and is switched to it. With this arrangement, in the system of this embodiment, since base stations to be connected to the mobile stations PSS1 to PSSm can be automatically switched from base stations having high traffic densities to base stations having low traffic densities, the call completing rate can be increased.

The present invention is not limited to the abovedescribed embodiments (first to fourth embodiments). For example, in each embodiment, free speech channels, i.e., free time slots of speech radio frequencies, are determined by the mobile stations PSS1 to PSSm. However, this determination may be performed by the base stations BSS1 to BSSn. Alternatively, the determination may be performed by both the mobile stations PSS1 to PSSm and the base stations BSS1 to BSSn.

In each embodiment described above, a search for a free time slot is performed at the time of transmission. However, this operation may be performed in a waiting state, and the searched time slot may be stored. This scheme is especially effective in the case wherein free time slots are determined by the base stations BSS1 to BSSn.

According to another modification, when free time slots are to be determined, a plurality of free time slots are selected and transmitted to the base stations or the mobile stations through transmission or reception signals. On the reception side which receives these transmission or reception signals, it may be confirmed that the plurality of notified free time slots are really free so that really free time slots are selected from these time slots to be used. With the abovedescribed arrangement, even if a time slot notified as a free time slot is used by another station or a time slot currently used by another station is erroneously detected as a free time slot depending on the positional relationship between mobile stations and base stations, a search for a free time slot need not be tried again. Therefore, the time required for speech connection in a transmission or reception operation can be shortened.

Furthermore, when a free time slot is to be determined, if two free time slots are present between currently used time slots, a free time slot may be set at a middle position at which the free time slot is separated from the currently used time slots TS1 and TS4, as shown in, e.g., FIG. 13(b). If another free time slot is to be determined in this state, the time slot set at the middle position may be shifted to a normal position so that the new time slot is set at the vacant place.

In each embodiment described above, the description is based on a radio telephone system for performing speech communication between the mobile stations PSS1 to PSSm and other stations. However, the present invention may be equally applied to a system wherein data terminals or facsimile terminals are used as mobile stations, and data communication or facsimile communication is performed between these terminals and other terminals.

Furthermore, according to each embodiment described above, the exemplified communication system is a system in which the plurality of mobile stations PSS1 to PSSm are arbitrarily connected to the plurality of base stations BSS1 to BSSn through radio channels in accordance with their positional relationships as in, e.g., a vehicle telephone system and a portable telephone system. However, the present invention can be applied to a system in which base stations BSS1 to BSSn and mobile stations which are assigned thereto in advance are connected to each other by radio as in, e.g., a cordless telephone system. In addition, the present invention may be applied to a mobile radio communication system of a so-called dual mode in which two schemes, i.e., analog and digital schemes, are selectively used as a radio transmission scheme between base and mobile stations.

In each embodiment described above, communication of a control signal is performed by using a control channel. However, the present invention may be applied to a system in which communication of a control signal is performed through a speech channel without using a control channel. In addition to the scheme in which different speech radio frequencies are used for an upstream speech channel from a mobile station to a base station and a downstream speech channel from a base station to a mobile station, different time slots of one speech radio frequency may be assigned to these speech channels of the opposite directions.

Moreover, in each embodiment described above, no control station is required because of the effect of the radio communication scheme of the present invention. However, the effect of the radio communication scheme of the present invention may be utilized to rearrange a communication system into a highly economical communication system in which the arrangement and control of a control station are further simplified.

With regard to other features, e.g., the signal formats of control and speech channels, the control sequences and contents of the control circuits of base and mobile stations, various changes and modifications can be made within the spirit and scope of the invention.

As has been described in detail above, in the communication system of the present invention, at least one of a base station and a mobile station is constituted by the use state determining means for determining the use states of each of the radio frequencies and each of the time slots on the basis of a received wave, the radio channel determining means, and the radio channel establishing means. On the basis of the determination result of the use state determining means, a radio frequency and a time slot used to connect a base station and a mobile station by radio are determined, and the radio channel based on the determined radio frequency and time slot is established between the base and mobile stations.

According to the system of the present invention, therefore, since a control station can be omitted or simplified, no large apparatus as in the prior art is required. In addition, flexibility with respect to changes in the system itself can be improved. Furthermore, an economical mobile radio communication system of a digital scheme can be provided as a small- or medium-sized communication system.

The present invention is characterized in that when a radio channel is to be determined, if the use state determining means determines that there is a currently used time slot in one time frame, the position of a time slot to be used next is determined with reference to the position of the currently used time slot. In contrast to this, if it is determined that no currently used time slot is present in one time frame, a time slot to be used next is set at an arbitrary position in one time frame. In addition, if the use state determining means determines that there is an interval in which a plurality of free time slots can be set between currently used time slots, a time slot to be used next is set at a middle position separated from the currently used time slots.

According to the present invention, therefore, a mobile radio communication system in which interference between time slots does not easily occur can be provided.

Furthermore, in the present invention, each mobile station comprises the means for setting the position of a control time slot, which is used to communicate a control signal with a corresponding base station so as to connect a radio channel therebetween, on the basis of a signal transmitted from the base station at a control radio frequency, and the battery saving means. The battery saving means serves to set a mobile station in a reception state only in a specific interval of each control time slot set by the above-mentioned means, and sets it in a non-reception state in other intervals. Therefore, management of control radio channels can be performed without using a control station. In addition, a mobile radio communication system which can simplify the system arrangement and improves the flexibility can be provided.

Moreover, according to the present invention, the service life of a battery in each mobile station can be prolonged by reducing the power consumption of each mobile station in a waiting state.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

What is claimed is:

1. A mobile radio communication apparatus connectable to a base station over channels of radio frequencies each having a frame format including a plurality of time slots, said mobile radio communication apparatus comprising:
   an antenna for transmitting and receiving signals at the radio frequencies;
   unused time slot detecting means coupled to said antenna for detecting unused time slots of a radio frequency by detecting the reception field intensity of said signals received at said antenna;
   time slot selecting means coupled to said unused time slot detecting means for selecting one of the unused time slots; and
   channel establishing means for establishing a channel between said mobile radio communication apparatus and said base station in accordance with the radio frequency and the selected time slot.

2. The mobile radio communication apparatus according to claim 1, wherein said time slot selecting means selects an unused time slot adjacent to a used time slot if at least one time slot of the radio frequency is used.

3. The mobile radio communication apparatus according to claim 2, wherein each of said time slots includes synchronization information and said time slot selecting means includes:
   synchronization information detecting means for detecting synchronization information of a used time slot of the radio frequency;
   calculating means for calculating a position of a time slot adjacent to the used time slot whose synchronization information is detected; and
   a memory for storing the position of the calculated time slot as the selected time slot, 4. The mobile radio communication apparatus according to claim 3, wherein said channel establishing means includes means for generating a transmission signal including information representing the position of the selected unused time slot, the radio frequency, and an identification code identifying said mobile radio communication apparatus and wherein said mobile radio communication apparatus further includes transmitting means coupled to said antenna for transmitting the transmission signal to said base station.

5. The mobile radio communication apparatus according to claim 4, wherein said channel establishing means establishes a channel for speech signals and wherein said mobile radio communication apparatus further comprises:
   a power amplifier for amplifying the speech signals; and
   switching means coupled to said power amplifier and said antenna for providing the amplified speech signals to said antenna only during a time period corresponding to the selected time slot of the radio frequency.

6. The mobile radio communication apparatus according to claim 1, wherein said unused time slot detecting means further includes means for detecting if the radio frequency has three or more unused time slots and wherein said time slot selecting means selects an unused time slot which is not adjacent to a used time slot if said unused time slot detecting means detects three or more unused time slots of the radio frequency.

7. The mobile radio communication apparatus according to claim 1, wherein said time slot selecting means includes means for randomly selecting one of the unused time slots of the radio frequency if said unused time slot detecting means detects that all time slots of the radio frequency are unused.

8. The mobile radio communication apparatus according to claim 1, wherein said unused time slot detecting means includes means for stepping through said radio frequencies until a radio frequency having unused time slots is detected.

9. The mobile radio communication apparatus according to claim 1, wherein said unused time slot detecting means is responsive to a caller send request.

10. The mobile radio communication apparatus according to claim 1, wherein said channel establishing means establishes a speech channel.

11. A mobile radio communication system, comprising:
   a wire network of telephones connected to each other through wire lines;
   a base station connected to said wire network through a wire line;
   a mobile radio communication apparatus connectable to said base station over channels of radio frequencies each having a frame format including a plurality of time slots,
   wherein at least one of said base station and said mobile radio communication apparatus comprises:
   an antenna for transmitting and receiving signals at the radio frequencies;
   unused time slot detecting means coupled to said antenna for detecting unused time slots of a radio frequency by detecting the reception field intensity of said signals received at said antenna;
   time slot selecting means coupled to said unused time slot detecting means for selecting one of the unused time slots; and
   channel establishing means for establishing a channel between said mobile radio communication apparatus and said base station in accordance with the radio frequency and the selected time slot.

* * * * *